(12) United States Patent
Bhattacharya et al.

(10) Patent No.: US 10,193,706 B2
(45) Date of Patent: Jan. 29, 2019

(54) DISTRIBUTED RULE PROVISIONING IN AN EXTENDED BRIDGE

(71) Applicant: ARRIS Enterprises LLC, Suwanee, GA (US)

(72) Inventors: Somen Bhattacharya, San Jose, CA (US); Rakesh Hansalia, Milpitas, CA (US); Ranganadh Muddana, Union City, CA (US); Senthil Paramasivam, Santa Clara, CA (US); Vignesh Dayabaran, San Jose, CA (US); Sai Gumudavally, Santa Clara, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 71 days.

(21) Appl. No.: 15/331,067

(22) Filed: Oct. 21, 2016

(65) Prior Publication Data

US 2017/0118041 A1    Apr. 27, 2017

Related U.S. Application Data

(60) Provisional application No. 62/244,587, filed on Oct. 21, 2015.

(51) Int. Cl.
*H04L 12/24* (2006.01)
*H04L 12/46* (2006.01)
(Continued)

(52) U.S. Cl.
CPC .......... *H04L 12/462* (2013.01); *H04L 12/467* (2013.01); *H04L 12/4625* (2013.01);
(Continued)

(58) Field of Classification Search
CPC ..... H04L 12/46–12/4695; H04L 41/02–41/28; H04L 43/02–43/50;
(Continued)

(56) References Cited

U.S. PATENT DOCUMENTS

| | | | |
|---|---|---|---|
| 6,950,855 | B2 | 9/2005 | Sampathkumar |
| 7,558,835 | B1 | 7/2009 | Shafer |

(Continued)

FOREIGN PATENT DOCUMENTS

| | | |
|---|---|---|
| EP | 2696538 A1 | 2/2014 |
| WO | 2017062671 A1 | 4/2017 |
| WO | 2017070587 A1 | 4/2017 |

OTHER PUBLICATIONS

U.S. Appl. No. 15/331,160, filed Oct. 21, 2016 by Somen Bhattacharya et al. (Unpublished.).

(Continued)

*Primary Examiner* — Timothy J Weidner
(74) *Attorney, Agent, or Firm* — Stewart M. Wiener

(57) ABSTRACT

Techniques for performing distributed provisioning of packet classification rules in an extended bridge are provided. According to one embodiment, a controlling bridge (CB) of the extended bridge can receive a command to create or delete a packet classification rule for one or more virtual ports of the extended bridge. The CB can further determine a port extender (PE) of the extended bridge that hosts one or more physical ports corresponding to the one or more virtual ports. The CB can then transmit a message to the PE with instructions for creating or deleting the packet classification rule in a ternary content addressable memory (TCAM) of the PE.

15 Claims, 21 Drawing Sheets

(51) Int. Cl.
*H04L 12/851* (2013.01)
*H04L 12/931* (2013.01)
*H04L 12/935* (2013.01)

(52) U.S. Cl.
CPC ...... *H04L 41/0233* (2013.01); *H04L 41/0806* (2013.01); *H04L 41/5054* (2013.01); *H04L 47/2441* (2013.01); *H04L 49/30* (2013.01); *H04L 49/45* (2013.01); *H04L 49/65* (2013.01); *H04L 49/70* (2013.01)

(58) Field of Classification Search
CPC .... H04L 47/2441; H04L 49/30–49/455; H04L 49/65; H04L 49/70; H04L 63/02–63/029; H04L 67/2866–67/2895; H04L 67/34; H04L 67/36
See application file for complete search history.

(56) References Cited

U.S. PATENT DOCUMENTS

| | | | |
|---|---|---|---|
| 7,675,869 B1 | 3/2010 | Anker et al. | |
| 8,995,457 B1 * | 3/2015 | Dropps | H04L 49/357 370/254 |
| 2009/0168657 A1 | 7/2009 | Puri et al. | |
| 2014/0044129 A1 * | 2/2014 | Mentze | H04L 49/354 370/390 |
| 2014/0086098 A1 | 3/2014 | Ao et al. | |
| 2014/0156906 A1 | 6/2014 | Babu et al. | |
| 2014/0181275 A1 | 6/2014 | Lin et al. | |
| 2014/0269710 A1 * | 9/2014 | Sundaram | H04L 45/302 370/392 |
| 2017/0085488 A1 | 3/2017 | Bhattacharya et al. | |
| 2017/0093628 A1 | 3/2017 | Lin et al. | |
| 2017/0104626 A1 | 4/2017 | Lin et al. | |
| 2017/0104665 A1 | 4/2017 | Gowthaman | |
| 2017/0104694 A1 | 4/2017 | Lin et al. | |
| 2017/0111296 A1 | 4/2017 | Agarwal et al. | |
| 2017/0118042 A1 | 4/2017 | Bhattacharya et al. | |

OTHER PUBLICATIONS

U.S. Appl. No. 15/489,395, filed Apr. 17, 2017 by Kwun-Nan Kevin Lin (Unpublished.).
Cisco Nexus 5600 Series NX-OS Layer 2 Switching Configuration Guide, Release 7.x; Mar. 15, 2014; Cisco Systems, Inc.; 280 pages.
Configuring the Fabric Extender, Chapter 2; Cisco Nexus 2000 Series Fabric Extender Software Configuration Guide; 16 pages.
Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.
Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.
U.S. Appl. No. 15/595,747, filed May 15, 2017 by Bipin Agarwal (Unpublished.).
U.S. Appl. No. 15/229,012, filed Aug. 4, 2016 by Lin et al. (Unpublished.).
U.S. Appl. No. 15/243,782, filed Aug. 22, 2016 by Ramesh Gowthaman (Unpublished.).
U.S. Appl. No. 15/272,218, filed Sep. 21, 2016 by Somen Bhattacharya (Unpublished.).
U.S. Appl. No. 15/276,579, filed Sep. 26, 2016 by Kwun-Nan Kevin Lin et al. (Unpublished.).
U.S. Appl. No. 15/276,619, filed Sep. 26, 2016 by Kwun-Nan Kevin Lin et al. (Unpublished.).
U.S. Appl. No. 15/286,472, filed Oct. 5, 2016 by Bipin Agarwal et al. (Unpublished.).
Cisco IOS Command Modes; http://www.cisco.com/c/en/us/td/docs/ios/12_2/configfun/configuration/guide/ffun_c/fcf019.html#wp1000922; Mar. 25, 2016; 20 pages.
Dell C9010 Module Switch Interoperability with Cisco Catalyst 3750, A Development Guide for Dell Networking Switches (v1.0), Dell Network Solutions Engineering, Sep. 2015, 24 pages.
Dell Networking C1048P Getting Started Guide, Sep. 2015, 26 pages.
Juniper Networks, Junos Fusion Provider Edge, Release 14.2R4, Feb. 17, 2016, 646 pages.
Cisco StackWise and StackWise Plus Technology, 2016 Cisco, Mar. 25, 2016, 11 pages.
Dell Stack Master Election, Dell Networking Configuration Guide for the C9000 Series Version 9.9 (0.0), Mar. 25, 2016, 1 page.
Dell Networking Configuration Guide for the C9000 Series, Version 9.9 (0.0), Oct. 2015, 1148 pages.
International Search Report and Written Opinion for International Appln. No. PCT/US2016/055827 dated Jan. 25, 2017, 15 pages.
Virtual Bridged Local Area Networks—Bridge Port Extension, IEEE Computer Society, IEEE Std 802.1 BR-2012, Jul. 16, 2012, 121 pages.
Brocade Fastlron Switch Port Extender, Configuration Guide, Supporting Fastlron Software Release 8.0.40, Feb. 29, 2016, 88 pages.
International Search Report and Written Opinion for International Appln. No. PCT/US2016/058283 dated Feb. 17, 2017, 12 pages.
Lockwood et al., "Automated Tools to Implement and Test Internet Systems in Reconfigurable Hardware", ACM SIGCOMM Computer Communications Review, vol. 33, No. 3, Jul. 2003, pp. 103-110.
NonFinal Office Action U.S. Appl. No. 15/331,160 dated Mar. 21, 2018.
International Preliminary Report on Patentability for International Appln. No. PCT/US2016/058283 dated May 3, 2018, 8 pages.

* cited by examiner

DISTRIBUTED RULE PROVISIONING IN AN EXTENDED BRIDGE

CROSS-REFERENCES TO RELATED APPLICATIONS

The present application claims the benefit and priority of U.S. Provisional Application No. 62/244,587, filed Oct. 21, 2015, entitled "Virtual Chassis with IEEE 802.1BR Port-Extension." In addition, the present application is related to commonly-owned U.S. patent application Ser. No. 15/331,160, filed concurrently with the present application, entitled "HIGH AVAILABILITY FOR DISTRIBUTED SECURITY SERVICES IN AN EXTENDED BRIDGE." The entire contents of these applications are incorporated herein by reference in their entireties for all purposes.

BACKGROUND

An IEEE 802.1BR-based network topology (referred to herein as an extended bridge) is a logical network entity that comprises two different types of units: controlling bridge (CB) units and port extender (PE) units. The CB (of which there may be one or multiple) serves as the controller of the extended bridge and is responsible for performing control plane functions (e.g., Layer 2 switching, Layer 3 routing, etc.) with respect to network traffic passing through the bridge. In contrast the PEs, which connect to the CB and to other devices/hosts external to the extended bridge, act as non-intelligent devices and thus typically do not perform any local switching or routing; instead, their primary function is to provide additional data port terminations for the CB (thereby extending the port capacity of the CB). For example, each PE may be a switch/router with X number of physical data ports, which appear as virtual data ports on the CB. Upon receiving a data packet from an external device/host on an ingress data port, the PE forwards the data packet to the CB, which processes the data packet in hardware or software to determine an appropriate egress port through which the packet should be sent out. The CB then forwards the data packet to the PE housing the egress port for transmission through that port towards the next hop destination.

PEs are generally connected to the CB according to a tree or chain topology, with the CB being the root of the tree/chain. The leaf-level PE nodes in the topology are known as edge PEs and the PE nodes at intermediate connection (e.g., tree branch) points are known as transit PEs. The edge PEs provide network services to various end hosts, which may include physical machines and/or virtual machines (VMs). In some embodiments, for scaling purposes, an extended bridge may include multiple CBs that connect to each other to form a linear or ring-based core stack. In these cases, the extended bridge may include multiple PE trees/chains, each rooted under a separate CB; such a configuration is sometimes referred to as a PE forest. One CB in the core stack may be designated as the master CB of the extended bridge and act as the central point of management for the entire bridge. Other CBs in the core stack may operate in a standby or member mode.

In recent years, there has been significant interest in deploying extended bridges for various high traffic volume applications such as campus networks, virtualized data centers (VDCs), private clouds, and the like. To support these and other similar use cases, an extended bridge should be highly scalable in multiple dimensions—e.g., in terms of number of connected PEs, number of network services supported, types of security threats that can be detected/neutralized, etc. However, one limiting factor to such scalability is the capacities of the hardware rule tables (i.e., ternary content addressable memories, or TCAMs) that reside on the CB(s). These TCAMs are typically programmed with packet classification rules that enable the CB(s) to make line-rate forwarding decisions with respect to the traffic passing through the bridge. When an extended bridge is scaled in various dimensions, the number of packet classification rules that need to be programmed into the TCAMs of the CB(s) will generally increase proportionally; in very large-scale systems, this number may grow into the millions or more. However, due to their cost and power requirements, the capacity of CB-level TCAMs are limited to a few hundred thousand rules at most. Thus, the TCAM capacities of the CB(s) in an extended bridge can become a critical bottleneck for system scalability.

SUMMARY

Techniques for performing distributed provisioning of packet classification rules in an extended bridge are provided. According to one embodiment, a CB of the extended bridge can receive a command to create or delete a packet classification rule for one or more virtual ports of the extended bridge. The CB can further determine a PE of the extended bridge that hosts one or more physical ports corresponding to the one or more virtual ports. The CB can then transmit a message to the PE with instructions for creating or deleting the packet classification rule in a TCAM of the PE.

The following detailed description and accompanying drawings provide a better understanding of the nature and advantages of particular embodiments.

DETAILED DESCRIPTION

Figure 1:
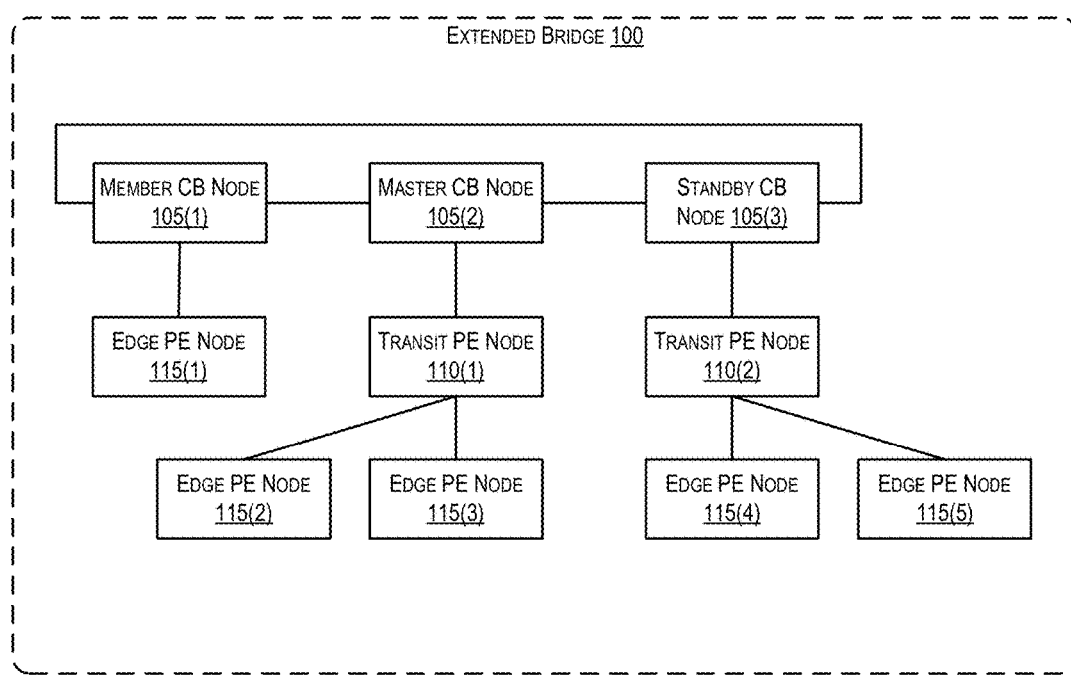
FIG. 1 depicts an example extended bridge according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for performing distributed provisioning of packet classification rules in an 802.1BR-based extended bridge.

According to one set of embodiments, a CB in the extended bridge can receive a command to create (i.e., program) a packet classification rule in a hardware rule table of the bridge with respect to one or more virtual ports of the CB. The packet classification rule can be received from, e.g., a user via a command-line interface (CLI) of the CB, a network application/protocol running on the CB, an external network management system (NMS), or another source. In response to the command, the CB can determine a PE in the extended bridge that hosts the physical port(s) corresponding to the virtual port(s) and can transmit, to that PE, a message with instructions to apply the command. The PE can then program, in accordance with the instructions, the packet classification rule into a local hardware rule table (e.g., TCAM) of the PE, thereby allowing the rule to be enforced locally at the PE level (rather than at the CB level) with respect to ingress or egress data traffic.

With this distributed rule provisioning scheme, the CB can take advantage the TCAM capacity that exists on each PE of the extended bridge to effectively decentralize programming and enforcement of packet classification rules (which was previously performed solely using the TCAM(s) of the CB) across the various PEs of the bridge. The types of packet classification rules that the CB may distribute to the PEs in this manner can include, e.g., security-related access control list (ACL) rules, rules pertaining to quality-of-service (QoS), rules pertaining to policy-based forwarding or routing, and others. By shifting the programming/enforcement of packet classification rules from the CB level to the PE level, TCAM resource constraints within the extended bridge can be alleviated since the aggregate TCAM capacity of all of the CBs and PEs in the bridge will be significantly higher than the TCAM capacity of the CBs alone. This, in turn, advantageously allows the extended bridge to scale to support very large scale applications/use cases.

In certain embodiments, in addition to performing distributed rule provisioning, the CB can maintain a virtualized representation of each PE TCAM in the extended bridge. In these embodiments, each time a modification (e.g., new rule creation, rule deletion, etc.) is made to a given PE TCAM, the CB can update its virtualized representation of that TCAM and thereby track the TCAM's resource usage and availability. Among other things, this allows the CB to make more intelligent rule provisioning decisions. For example, before transmitting a packet classification rule to a PE for local programming in its TCAM, the CB can first check whether the TCAM has available free space per the virtualized representation. If the TCAM does not have any free space, the CB can cause the rule to be programmed into the TCAM of an alternative unit (such as the CB itself).

In further embodiments, the techniques of the present disclosure can include techniques for performing distributed event monitoring and information collection/reporting for various types of information that may collected or generated at the PEs and CBs. In one embodiment, this information can include statistics pertaining to the packet classification rules distributed to each PE (e.g., the number of times each rule is "hit," etc.). In other embodiments, this information can include other types of data such as system log events, unit health/fault information, troubleshooting/debug information, etc.

2. Example Extended Bridge and Switch/Router Architecture

FIG. 1 depicts an extended bridge 100 in which embodiments of the present disclosure may be implemented. As shown, extended bridge 100 includes interconnected CBs 105(1)-(3), transit PEs 110(1)-(2), and edge PEs 115(1)-(5). CBs 105(1)-(3), transit PEs 110(1)-(2), and edge PEs 115(1)-(5) are network devices (e.g., routers and/or switches) that collectively function as a single logical router or switch per the IEEE 802.1BR bridge port extension standard. The interior links and units within extended bridge 100 form what is referred to as an extended bridge fabric. CBs 105(1)-(3) may be implemented using high-end routers or switching devices while PEs 110(1)-(2) and 115(1)-(5) may be implemented using simpler devices that are built from lower cost hardware and are less sophisticated than the CBs.

In the example of FIG. 1, CBs 105(1)-(3) are linked together according to a ring topology that represents a core stack of extended bridge 100. In addition, extended bridge 100 comprises multiple rooted PE trees (i.e., a PE forest). In particular, CB 105(1) and edge PE 115(1) form a first rooted PE tree; CB 105(2), transit PE 110(1), and edge PEs 115(2)-(3) form a second rooted PE tree; and CB 105(3), transit PE 110(2), and edge PEs 115(4)-(5) form a third rooted PE tree. Each CB at the root of a PE tree is known as a parent CB and the PE devices forming the body of each tree are known as cascaded PEs.

As mentioned previously, one CB in an extended bridge may be designated as a master CB that is responsible for controlling and managing the functional operation of the entirety of the bridge. In FIG. 1, CB node 105(2) is designated as the master CB of extended bridge 100. Master CB 105(2) may be responsible for, e.g., receiving network management commands from various network management applications (e.g., an SNMP manager, a command line interface (CLI) application, a web-based network management application, etc.) and applying and forwarding those management commands to other units of bridge 100 (e.g., transit PEs 110(1)-(2) and edge PEs 115(1)-(5)). Master CB 105(2) may also perform other functions, such as running a variety of different routing, network discovery, network management, and Layer 2 bridging protocols, performing unicast/multicast routing table and forwarding table calculations, performing traffic engineering and policing, and so on.

It should be appreciated that extended bridge 100 is illustrative and not intended to limit embodiments of the present disclosure. For example, while FIG. 1 shows CB 105(2) as the designated master CB, any of CBs 105(1)-(3) may be configured to perform the operations described above with respect to master CB 105(2). Thus, any of CBs 105(1)-(3) may serve as the master CB of extended bridge 100. For instance, CB 105(3) (which is designated as a standby CB) may switch to operate as the master CB of extended bridge 100 in the event that CB 105(2) fails.

As another example, although FIG. 1 depicts a particular number of CBs (3), transit PEs (2), and edge PEs (5), any number of CB nodes, transit PE nodes, and edge PE nodes may be supported.

As yet another example, while FIG. 1 shows these units as being interconnected according to a particular topology, the embodiments described herein may be applied to extended bridges having any other type of topology. One of ordinary skill in the art will recognize many variations, modifications, and alternatives.

Figure 2:
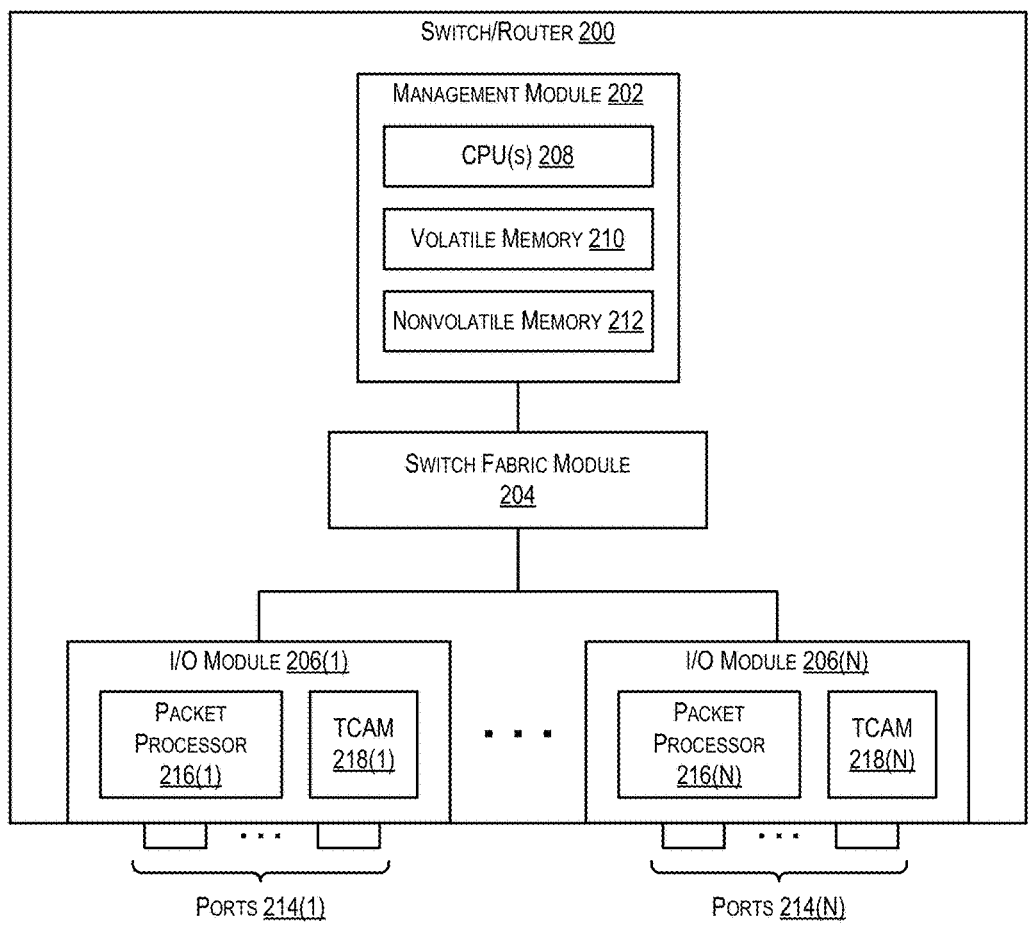
FIG. 2 depicts an example switch/router architecture according to an embodiment.

FIG. 2 depicts the architecture of an example switch/router 200 that may be used to implement the CBs or PEs of FIG. 1 according to an embodiment. As shown in FIG. 2, switch/router 200 comprises a management module 202, a switch fabric module 204, and one or more I/O modules 206(1)-(N). Management module 202 includes one or more management CPUs 208 for managing and controlling the operation of switch/router 200. Each management CPU 208 can be a general purpose processor, such as a PowerPC, Intel, AMD, or ARM-based processor, that operates under the control of software stored in an associated volatile memory (e.g., RAM) 210 and/or nonvolatile memory (e.g., ROM, flash memory, etc.) 212.

Switch fabric module 204 and I/O module(s) 206(1)-(N) collectively represent the data, or forwarding, plane of switch/router 200. Switch fabric module 204 is configured to interconnect the various other modules of switch/router 200. Each I/O module 206(1)-(N) includes one or more ports 214(1)-(N) that are used by switch/router 200 to send and receive data packets to/from other networks/hosts, as well as to/from other units within extended bridge 100 of FIG. 1.

Each I/O module 206(1)-(N) also includes a packet processor 216(1)-(N) and an associated hardware rule table (e.g., TCAM) 218(1)-(N). Each TCAM is programmed with a number of packet classification rules that are used by its associated packet processor to make wire-speed decisions on how to handle/process incoming and outgoing traffic. For example, when a packet is received on a port 214(X), packet processor 216(X) can parse the header of the packet and can extract one or more header fields to form a lookup key. Packet processor 216(X) can then perform a lookup into TCAM 218(X) using the lookup key and can receive from the TCAM an index of a packet classification rule that has matched the key. Finally, packet processor 218(X) can apply an action defined in the matched rule to the incoming packet (e.g., drop, trap to CPU, update a packet counter, modify one or more packet header fields, forward to next hop, etc.).

As noted in the Background section, one limitation with scaling an extended bridge such as bridge 100 of FIG. 1 pertains to the capacities of the TCAMs resident on the CBs (and in particular, the master CB) of the bridge. As an extended bridge grows in terms of, e.g., the number of connected PEs, the number of supported services, etc., the number of packet classification rules that need to be defined and programmed into the hardware of the bridge also grows. However, conventional extended bridges require that all such rules are programmed and enforced at the CB level. This means that the sizes of the CB TCAMs (which are relatively small due to cost and power considerations) act as a hard limit on the degree to which an extended bridge can be scaled out.

To address these and other similar issues, switch/router 200 of FIG. 2 can be enhanced to support distributed provisioning of packet classification rules when operating as a CB in an extended bridge, such as CBs 105(1)-(3) of FIG. 1. These techniques, which can be implemented via program code that is executed by management CPU(s) 208 and/or via one or more new hardware modules that are added to switch/router 200 (not shown), enable each CB (when operating as the master CB) to distribute packet classification rules to the PEs in the bridge for local programming and enforcement via the TCAMs of those PEs (rather than via the CB TCAMs). This eliminates CB TCAM capacity as a bottleneck for system scaling, since the aggregate TCAM capacity of the PEs will generally be higher (and will continue to increase as additional PEs are added).

In certain embodiments, as part of this distributed rule provisioning scheme, the master CB can performed virtualized TCAM management of the PE TCAMs in the extended bridge. In this way, the master CB can centrally track the resource usage and availability of each PE TCAM, which can aid the rule provisioning process.

In further embodiments, techniques are provided for performing distributed event monitoring at the PEs and reporting various types of information that may associated with the events (e.g., operational statistics, system logging information, health/fault information, debug/troubleshooting information, etc.) from the PEs to the CBs. These and other aspects are described in further detail in the sections that follow.

Figure 3:
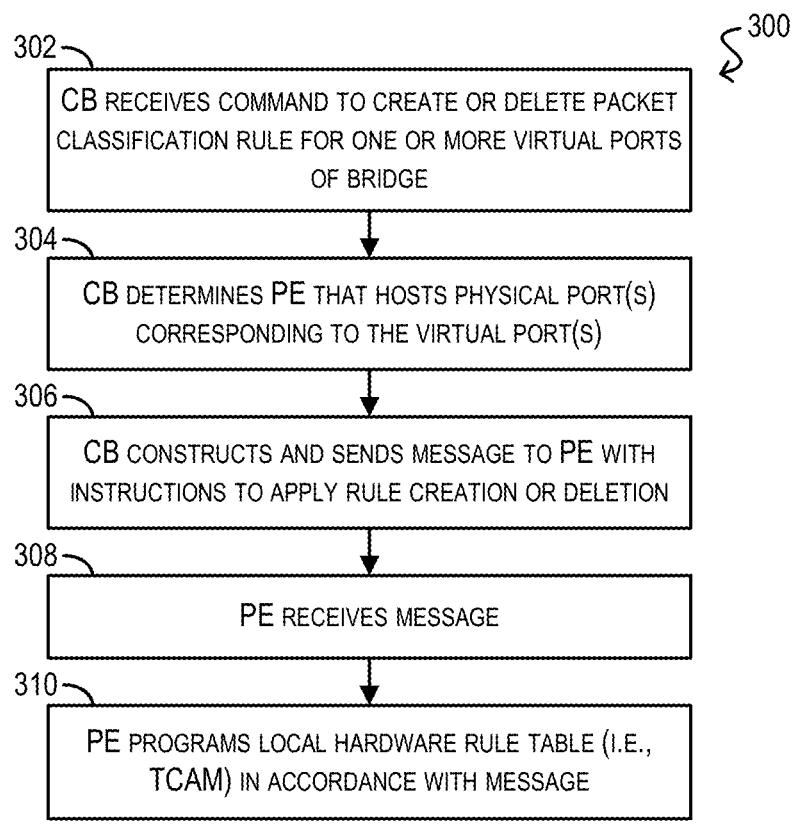
FIG. 3 depicts a high-level workflow for performing distributed rule provisioning according to an embodiment.

3. Distributed Rule Provisioning and Virtualized TCAM Management 3.1 High-Level Workflows FIG. 3 depicts a high-level workflow that may be performed by switch/router 200 of FIG. 2 while acting as a master CB in an extended bridge (e.g., master CB 105(2) of FIG. 1) for provisioning packet classification rules to PEs in the extended bridge to enable local programming of those rules at the PE level according to an embodiment.

Starting with block 302, the CB can receive a command to create (i.e., program) or delete a packet classification rule in hardware with respect to one or more virtual data ports of the extended bridge. In one embodiment, this command can be received from a user via a CLI or other user interface. In other embodiments, this command can be received from an application running on the CB (e.g., a network protocol or service) or an external network management system. The types of packet classification rules that may be specified via the command include, e.g., ACL rules that are used for security purposes, rules pertaining to QoS, rules pertaining to traffic engineering, and so on.

At block 304, the CB can determine a PE in the extended bridge that hosts the physical port(s) corresponding to the one or more virtual ports. The CB can perform this step by, e.g., consulting a local configuration database or data structure that specifies the topology of the bridge.

Upon determining the PE hosting the physical port(s) corresponding to the virtual port(s), the CB can construct and send a message to that PE with instructions to apply the command (i.e., create or delete the specified rule) (block 306). In one embodiment, this transmission can be performed via a reliable mechanism (e.g., a transaction manager, described below) that ensures the message is received by the PE.

Then, at blocks 308 and 310, the PE can receive the message and can program a local hardware rule table (e.g., TCAM) of the PE in accordance with the command. For example, if the command specifies the creation of rule R1, the PE can program rule R1 into a free entry of its local TCAM. Similarly, if the command specifies the deletion of rule R2, the PE can uninstall rule R2 from its local TCAM. In this way, the rule can be enforced (or stop being enforced) at the PE level on data traffic that is entering or leaving the PE.

Figure 4:
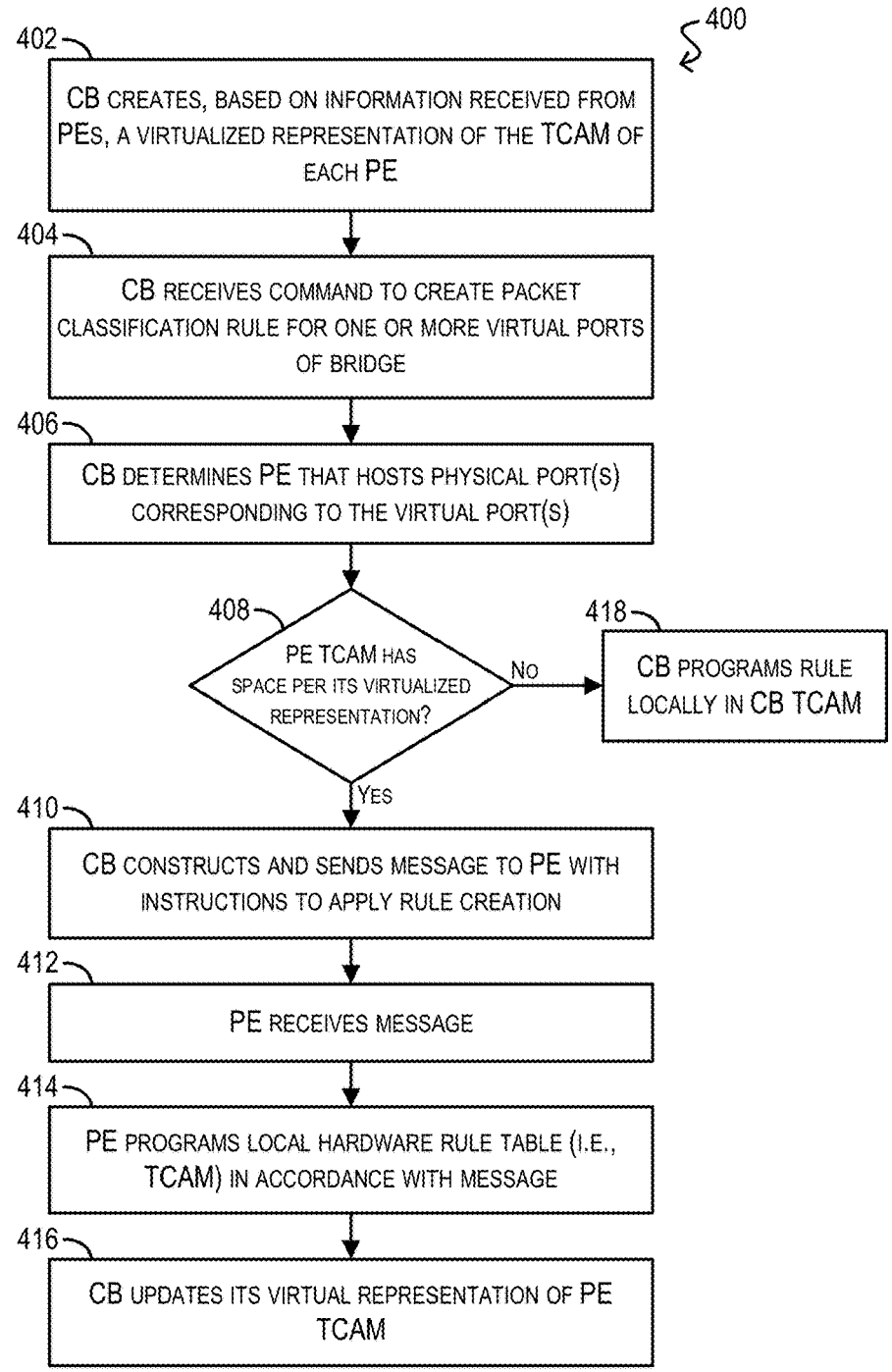
FIG. 4 depicts a high-level workflow for performing distributed rule provisioning in combination with virtualized PE TCAM management according to an embodiment.

As mentioned previously, in some embodiments the master CB may maintain a virtualized representation of each PE TCAM in the extended bridge. In this way, the master CB can track the resource usage and availability of each TCAM for various purposes, such as performing more intelligent rule provisioning. FIG. 4 depicts a high-level workflow 400 may be performed by switch/router 200 of FIG. 2 while acting as a master CB for performing this virtualized TCAM management according to an embodiment.

Starting with block 402, the CB can create, based on information received from the PEs in the extended bridge, a virtualized representation of the TCAM(s) of each PE. The virtualized representation can include, e.g., an indication of the total capacity (i.e., size) of the TCAM, as well as the number and/or indexes of entries of the TCAM that are currently programmed with rules. Since PEs can dynamically join the extended bridge at any point during system runtime, block 402 can be performed on per-PE basis at the time each PE joins the bridge. In one embodiment, the information that is used to create the virtualized TCAM representation(s) can be included in Link Layer Discovery Protocol (LLDP) messages that are sent from each PE to the master CB at the time that PE joins the bridge.

At block 404, the CB can receive a command to program a packet classification rule in hardware with respect to one or more virtual ports of the extended bridge. This step can be substantially similar to block 302 of FIG. 3.

In response to the command, the CB can determine a PE in the extended bridge that hosts the physical port(s) corresponding to the one or more virtual ports (block 406) and can check whether the TCAM of that PE has sufficient free space to store the new rule per its virtualized representation (block 408). If it does, the CB can send a message to the PE with instructions to apply the command (block 410), which in turn causes the PE to receive the message and program the rule into its TCAM (blocks 412 and 414). The CB can also update it virtual representation of that PE TCAM to include the newly programmed rule (block 416).

On the other hand, if the CB determines that the TCAM of that PE does not have sufficient free space to store the new rule at block 408, the CB can program the rule locally (i.e., on a TCAM of the CB) (block 418). In this way, the rule can be enforced at the CB level when data traffic is forwarded from the PE to the CB.

It should be appreciated that workflows 300 and 400 are illustrative and various modifications are possible. For example, although these workflows indicate that the CB identifies and distributes each rule to a particular PE (e.g., the PE hosting the physical ports to which the rule applies), in some embodiments the CB may distribute each rule to all edge PEs in the extended bridge. In these embodiments, each edge PE may determine whether the rule is relevant to its local ports, and if so can program its TCAM(s) accordingly. One of ordinary skill in the art will recognize other modifications, variations, and alternatives.

3.2 Implementation Details

The following sub-sections discuss various low-level details and workflows that may be used to implement the rule provisioning and virtualized TCAM management framework described above. In the following sections, references to "ACLs" or "ACL rules" are intended to refer to "packet classification rules" as used elsewhere in this disclosure.

3.2.1 ACL Rule Provisioning Via Transaction Manager

Figure 5:
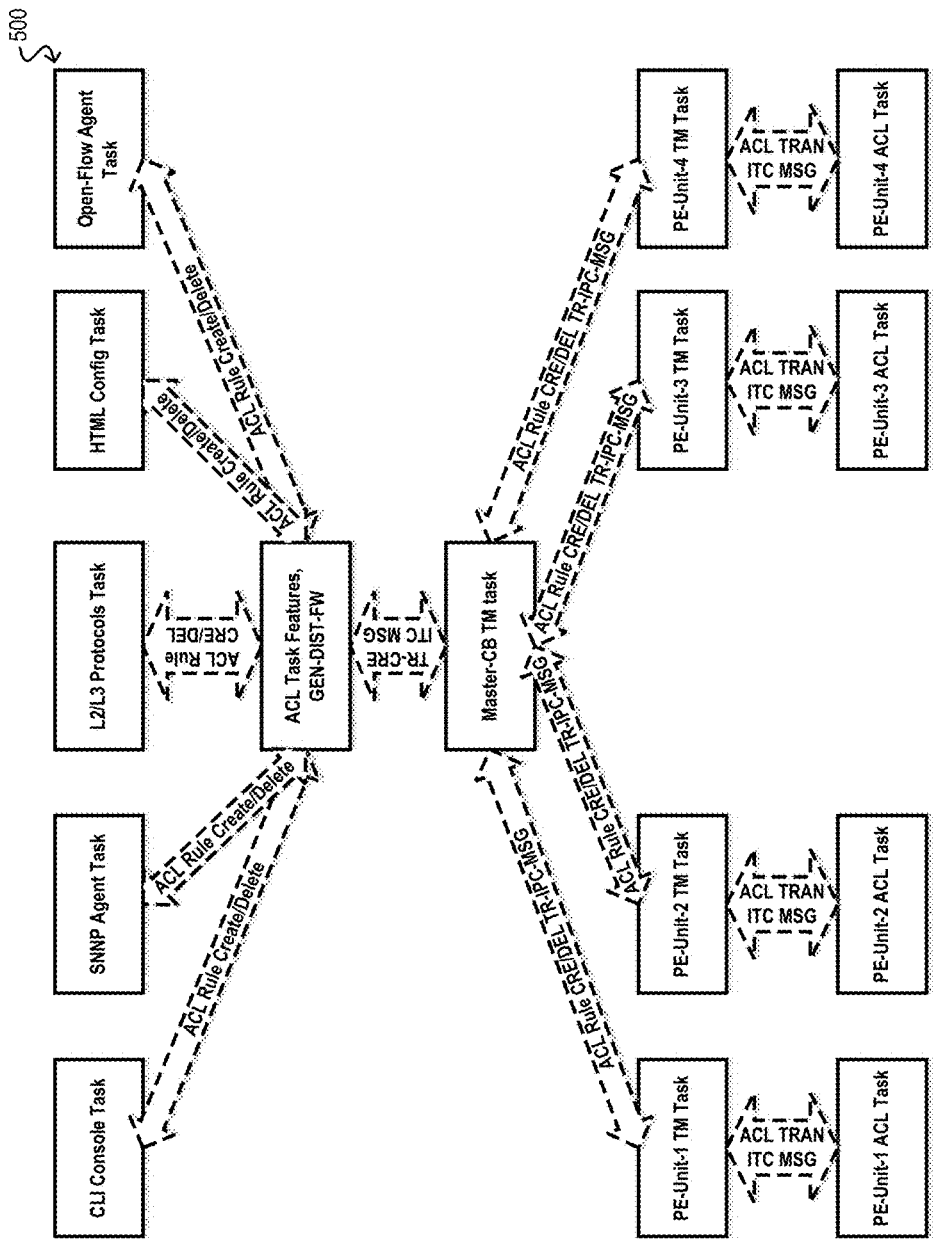
FIG. 5 depicts an example rule provisioning model comprising a transaction manager according to an embodiment.

As mentioned previously, in some embodiments the master CB can transmit the messages for creating or deleting packet classification rules (i.e., "ACL rules") to the PEs in the extended bridge via a transaction manager component that runs on each CB and each PE. The transaction manager can ensure that the messages are delivered in a reliable manner. FIG. 5 depicts a diagram 500 of an example rule provisioning model that includes this transaction manager component on each bridge node (referred to as "TM Task").

The ACL rules are typically configured by the network administrator via CLI or SNMP based network management for firewall setup or as packet classification rules needed for QoS services.

Certain routing protocol applications, e.g. OSPF, ISIS, BGP, multicast routing protocols e.g. PIM-SM, PIM-SSM, PIM-BIDIR, IP multicast group management protocols e.g. IGMP, MLD etc. may also require ACL rules for policy based selective filtering or accepting of inbound and/or outbound control protocol traffic.

Layer-2 control protocols that run on Ethernet bridging/switching devices e.g. LLDP which is used for Ethernet topology discovery, RSTP, MSTP which are Spanning Tree bridging control protocols may also require ACL services for inbound/outbound control packet forwarding.

Similarly Ethernet switching/bridging devices perform various modes of VLAN tagging operations on incoming/outgoing Ethernet packets, when functioning as single VLAN Tagging (C-VLAN), double VLAN Tagging (S-VLAN or Provider Bridging mode), MAC-in-MAC i.e. Provider Backbone Bridging (PBB) also require services of ACL Rules.

When an extended bridge unit facilitates tunneling of Virtual Data Center (VDC) tenant or customer's VLAN tagged traffic through the VXLAN or NVGRE based overlay tunnel mechanism, services of ACL rules may also be required.

An extended bridge may also receive several ACL rules as traffic flow classification provisioning or de-provisioning requests dynamically from an external OpenFlow controller system.

Thus in all scenarios of ACL rules service requests, those ACL rules should be provisioned on the hardware forwarding engines of one or more member CB devices and one or more PE devices in the extended bridge topology.

Since the IEEE-802.1BR standard recommends a single point of configuration management, the master CB node is responsible for provisioning or de-provisioning of all the ACL Rules configuration requests needed for various Layer-2 and Layer-3 protocol applications, Virtual Data Center (VDC) Overlay Tunneling, and Software Defined Network (SDN) OpenFlow controller's flow management requests.

The master CB node transforms all ACL rule provisioning or de-provisioning requests into generic transaction distribution requests, which are then handed over to the Distributed Transaction Manager (DTM) sub-system for delivery to remote destinations, via member CB and PE devices in the extended bridge topology.

The DTM is a generic distributed transaction management services provider which utilizes the services of a lower level Inter-Processor Communication (IPC) Protocol and the IEEE-802.1BR standard CSP/ECP transport mechanism for the distribution of transaction messages from the master CB to member CB and PE devices. The DTM facilitates both Point-To-Point (PTP) and Point-To-Multi-Point (P2MP) models of transaction distribution inside the extended bridge topology at a peer-to-peer level. In other words the DTM accepts transaction requests from an ACL sub-system task, at the master CB node and delivers the transaction request message to corresponding ACL sub-system task(s) at remote member CB and PE device(s) inside the topology.

The DTM facilitates guaranteed transaction delivery services, i.e. when the ACL rules provisioning or de-provisioning actions are completed on the remote member CB and PE devices the DTM fetches the results of ACL provisioning or de-provisioning actions as transaction delivery status and notifies those statuses as a consolidated success or failure status back to the ACL sub-system on the master CB node.

In the event of a provisioning failure at one or more remote devices, the DTM facilitates a rollback recovery mechanism to guarantee that the requested ACL rules are either successfully provisioned on all the targeted remote devices or not provisioned on any of the devices.

3.2.2 Low-Level Rule Create/Delete Workflow

Figure 6:
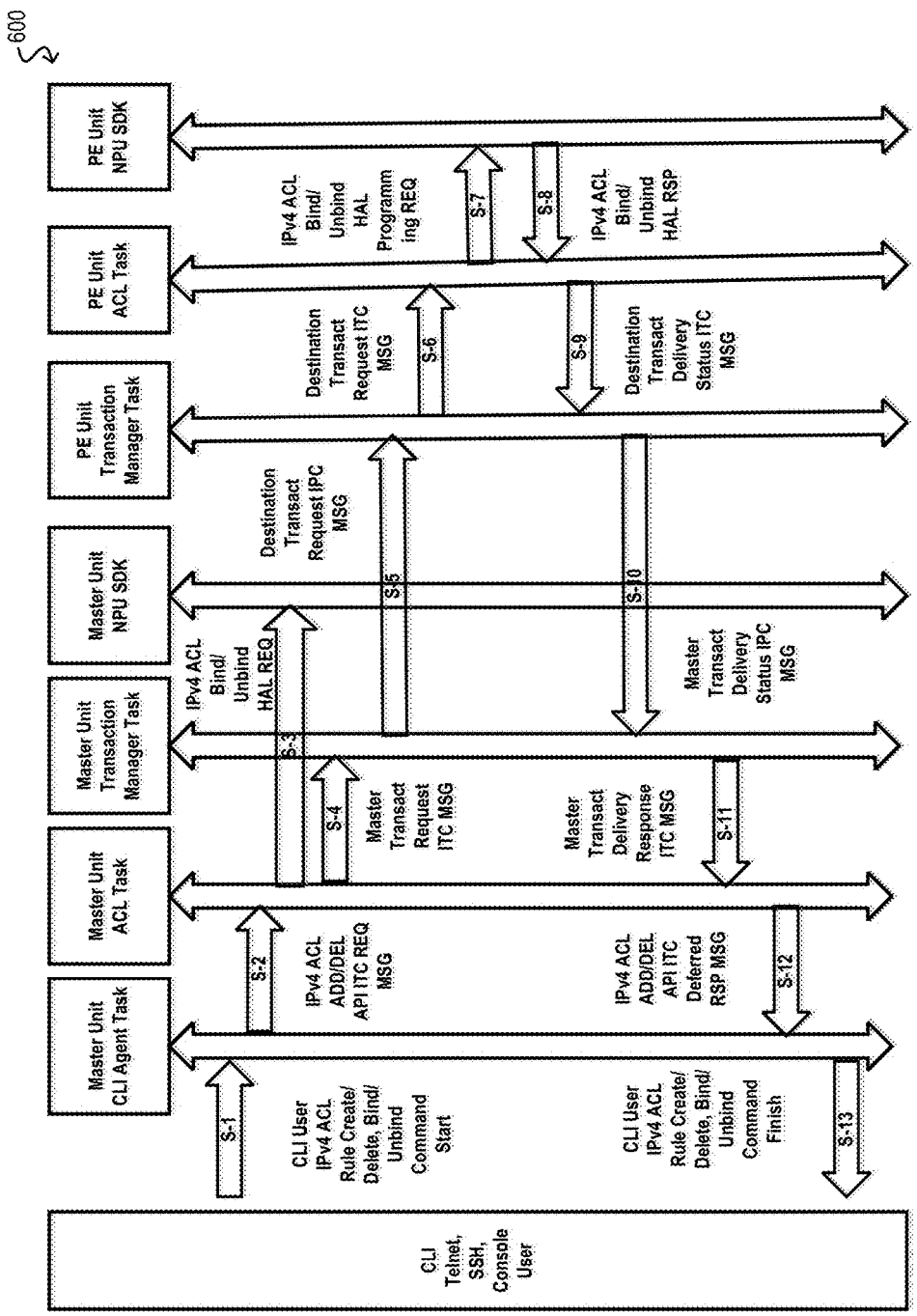
FIG. 6 depicts a low-level workflow for performing distributed rule provisioning according to an embodiment.

FIG. 6 depicts a low-level workflow 600 for provisioning a rule to be created or deleted from the master CB (i.e., "master-unit") to a PE (i.e., "member-unit") according to an embodiment. The steps of workflow 600 are similar to high-level workflow 300, but identify specific application programming interface (API) calls that may be made between various software modules running on the master CB and PE (e.g., CLI agent task, ACL task, transaction manager task, etc.).

The complete life-cycle management flow of an ACL rules provisioning/de-provisioning process is enumerated below according to an embodiment:

1. NMS/End-User-Application sends an ACL Rule create request via Inter-Task Communication (ITC) request message to ACL Task at the Master CB device.
2. The ACL-Task at Master CB device allocates a Distribution Request Object (DIST-REQ) using the API services of 'Generic Distribution Framework (GEN-DIST-FW)' to prepare a Transaction request message.
3. The ACL-Task populates the DIST-REQ with the specific ACL Rules provisioning action details.
4. The ACL-Task sets the required list of Destination PE devices Identifications in the DIST-REQ.
5. If the ACL Rules provisioning request is meant to be programmed or de-programmed on specific Ethernet Ports of remote PE devices, then a set of Port Mask bits is assigned on the DIST-REQ so that destination PE devices would be able to identify which Ethernet ports the Rules programming/de-programming need to be performed.
6. ACL-Task then invokes the GEN-DIST-FW's distribution API to submit the Transaction message to the Distributed Transaction Manager (DTM) Task.
7. The GEN-DIST-FW which is the abstract API services layer and runs in the context of client application, ACL-Task maintains a copy of the Transaction message in the in-memory pending transaction database.
8. The DTM-Task on the Master CB device then distributes the received Transaction request to the client user specified list of remote destination PE devices by utilizing a reliable and guaranteed message delivery services of a Brocade Communications Inc's proprietary 'Reliable Inter-Processor Communication (REL-IPC)' mechanism and IEEE-802.1BR CSP/ECP based transport mechanism.
9. The peering client application, i.e. ACL Task at the remote destination Member CB and/or PE devices, register via the Generic Distribution Framework (GEN-DIST-FW) Call-Back API mechanism to receive the transaction payloads which contain the ACL Rules provisioning or de-provisioning requests.
10. The ACL Task on the destination devices then completes the ACL Rules provisioning or de-provisioning requests against the Hardware Forwarding Engine (HFE), by invoking Hardware Abstraction Layer (HAL) API(s) and the SDK API(s) of the vendor's Packet Processor ASIC.
11. The success or failure of the ACL Rules programming or de-programming at the remote destination devices is then returned to the DTM of the Master CB node, with the help of Transaction Response dispatching API provided by GEN-DIST-FW API services Layer.
12. When the Transaction delivery response is received at the Master CB node, the pending Transaction object which contains the details of the client Application's ACL Rule provisioning de-provisioning request is located in the database by performing a lookup on a unique Key which is a 32-bit integer called Transaction-ID.
13. Once the pending Transaction object is located from the in-memory transaction database maintained by the GEN-DIST-FW, the received status as either success or failure of the completed transaction is notified to the client application e.g. ACL Task.
14. The ACL-Task then prepares further a higher level success or failure response and notifies to the end-user application, e.g. CLI task, SNMP Agent task, Layer-2 or Layer-3 Protocol application Task(s), or Open-Flow Controller Agent Task, which had requested for ACL Rules provisioning or de-provisioning.
15. The ACL-Task the requests the GEN-DIST-FW API services Layer to delete the DIST-REQ object, the pending Transaction entry and also deallocates all resources attached to the transaction.

3.2.3 Multi-Instanced ACL Rule Provisioning Architecture

Figure 7:
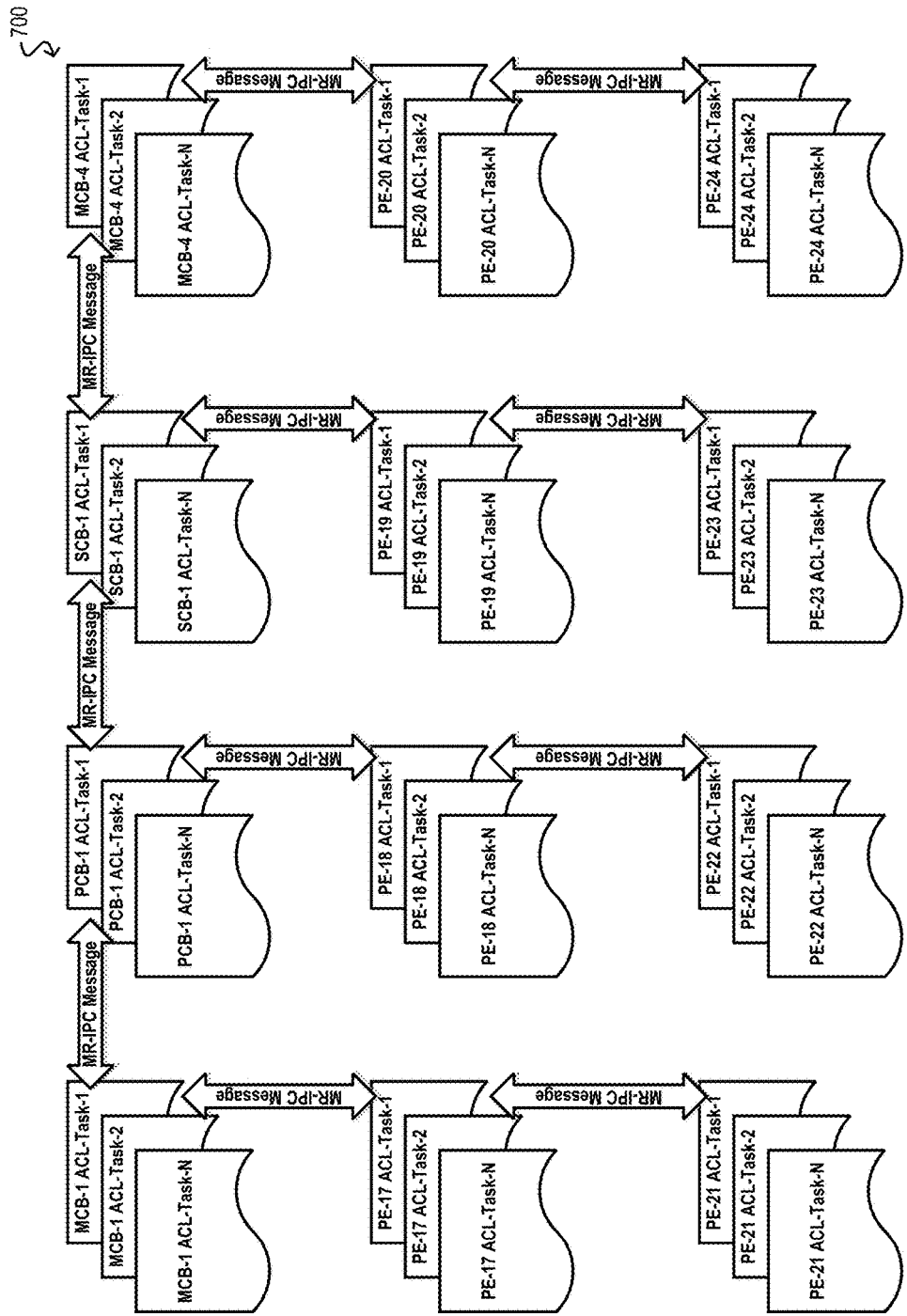
FIG. 7 depicts an example multi-instance rule provisioning architecture according to an embodiment.

In certain embodiments, the rules provisioning workflows shown in FIGS. 3 and 4 may be performed via a multi-instanced architecture that comprises multiple rule provisioning task instances running on each CB and PE. Each task instance can be responsible for handling the provisioning steps for a particular rule (or group of rules). For example, FIG. 7 depicts a diagram 700 illustrating this architecture according to an embodiment.

With this type of architecture, rules can be provisioned from the CBs to the PEs in parallel via the multiple task instances, and thus performance can be improved over a more serial architecture.

The firewalling and packet classifications related ACL rules service is expected to grow primarily due to two reasons, a) due to increasing deployment of Plug-'n'-Play model PE devices and due to increasing port densities on the PE devices. Thus the ACL rules management and rules provisioning overhead in the ACL task would also increase significantly.

A single instance of ACL task which is a single OS thread abstraction may become congested posing a performance bottleneck due to increasing number of ACL rules requirement to satisfy traffic flow classification needs of several customers.

In order to reduce the load of ACL rules processing overhead, the software architecture of extended bridge can support multiple instances of ACL task(s) as shown in FIG. 7, with each instance being modeled as a separate OS thread.

When the system supports multiple instances of ACL task(s), the ACL rules provisioning requests can be load balanced across the ACL task instances based on system policies. An example policy could be to assign ACL rules provisioning requests for all PE device's ports under the rooted tree of each of the CB devices to a separate instance of ACL task. Alternatively ACL filtering services can be further sub-divided into e.g. IPv4 Filters, IPv6 Filters, MAC Filters, Traffic Engineering Policy application Filters, DHCP Snooping Filters, Dynamic ARP inspection Filters, Policy Based Routing (PBR) Filters etc., and an ACL processing job for each sub-category can be assigned to a separate ACL task instance (i.e., OS thread).

When the host processors on the CB and/or PE devices support multi-core CPU architecture, the multiple instances of ACL task can be distributed across the CPU cores, giving rise to more load balanced and parallel execution of various types of ACL rules provisioning/de-provisioning, DOS/DDOS attack processing, ACL hit counters monitoring, ACL packet logging etc.

The ACL task instances can be dynamically created depending on the number of CB devices discovered and operational in the extended bridge topology.

In some embodiments, the extended bridge may support a virtualized software architecture, in which case the system resources on the CB and/or PE devices may be partitioned via an OS abstraction of containerization or via virtual machines. Each such partition in the CB device can be treated as a virtual CB device, and similarly each partition on the PE device can be treated as virtual PE device. Thus, for effective load balancing of system resources, each virtual CB device may be configured to handle the ACL rules processing that are destined to only a subset of physical PE devices or a subset of the virtual PE devices.

3.2.4 Distributed Rule Provisioning Generic Framework

Figure 8:
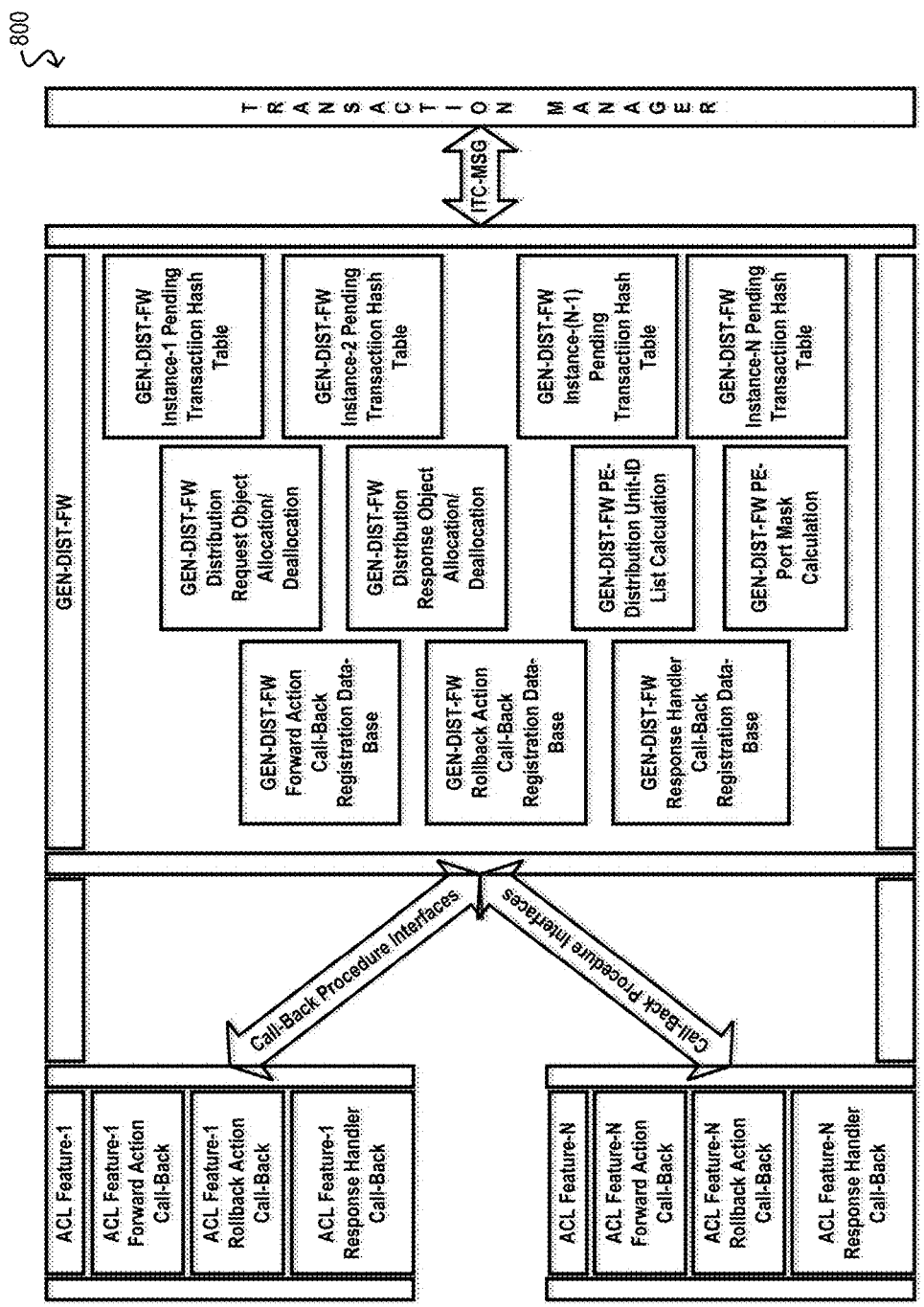
FIG. 8 depicts a diagram of an ACL feature-to-generic distribution interface according to an embodiment.
Figure 9:
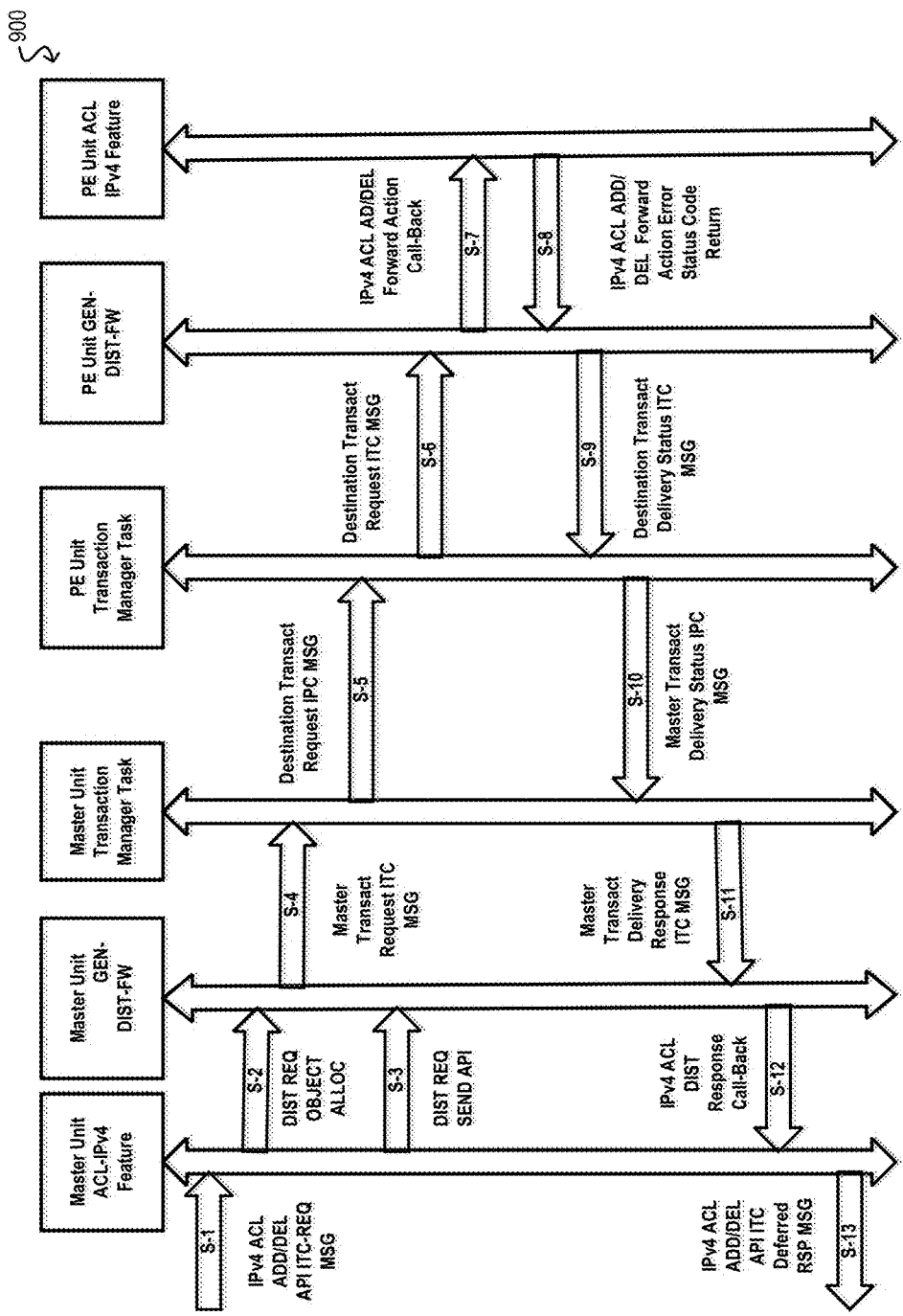
FIG. 9 depicts a low-level workflow for performing distributed rule provisioning via the interface of FIG. 8 according to an embodiment.

FIG. 8 depicts a diagram 800 of an "ACL Feature-To-Generic Distribution Interface" and FIG. 9 depicts a workflow 900 for distributing a rule to be created or deleted via the interface of FIG. 8 according to an embodiment.

For all ACL rules provisioning or de-provisioning request handling, the ACL task on each bridge unit utilizes the services of a Generic Distribution Framework (GEN-DIST-FW). The GEN-DIST-FW is essentially an abstract API services layer that facilitates communication between a Distributed Transaction Manager (DTM) and client applications, e.g. ACL task.

To facilitate easy communication with the DTM task and handling of transactions needed for ACL rules provisioning/de-provisioning, the GEN-DIST-FW provides the following types of abstract API(s):

Distribute Request Object (DIST-REQ) allocation needed for Transaction message object creation.

Distribute Request Object freeing for deletion of transaction message.

Distribute Response Object (DIST-RESP) allocation, needed for sending transaction delivery response.

Distribute a Transaction to the client user specific list of destination PE devices and/or Member CB devices.

Maintenance of pending Transactions in in-memory Transaction database for correlating received transaction delivery responses with the original transaction requests.

Managing and allocation of unique Transaction Identifiers.

HA Synchronization, i.e. replicating pending transactions and last used Transaction Identifiers sequence numbers from Master CB to the Standby-CB.

The replicated pending Transactions will be used by the Standby-CB to track the incomplete transactions in the event of a Master CB failover after which the Standby-CB will assume the role of new Master CB and continue processing of the pending Transactions.

Provides Transaction message delivery Call-Back API mechanism for the peering client applications, i.e. ACL Task at the remote destination Member CB and/or PE devices.

The client applications, e.g. ACL Task registers Forward Action Call-Back API for receiving the ACL rule provisioning request that is carried in the transaction message payload.

The client applications, e.g. ACL Task registers Rollback Action Call-Back API for receiving the ACL rule provisioning rollback request due to a provisioning failure at one or more destination PE devices and/or destination Member CB devices.

To facilitate transaction distribution from multiple different client applications in an independent and parallel manner, a Client Application Channel is defined and a 32-bit integer quantity is used to represent a Client Application Channel ID.

Both DTM and GEN-DIST-FW API layer supports transaction delivery services on a per Client application channel basis and supports simultaneous transaction distributions over multiple client application channels to facilitate non-blocking and high performance ACL rules provisioning services needed by multiple different independent Client Applications.

Facilitates single Transaction response delivery at Master CB, i.e. single consolidated response on behalf of all the addressed remote destination PE and/or Member CB devices.

Facilitates individual Transaction response delivery at Master CB, i.e. based on the received responses from each of the addressed remote destination PE and/or Member CB devices.

3.2.5 Distributed Rule Forwarding Engine Capabilities Discovery

Figure 10:
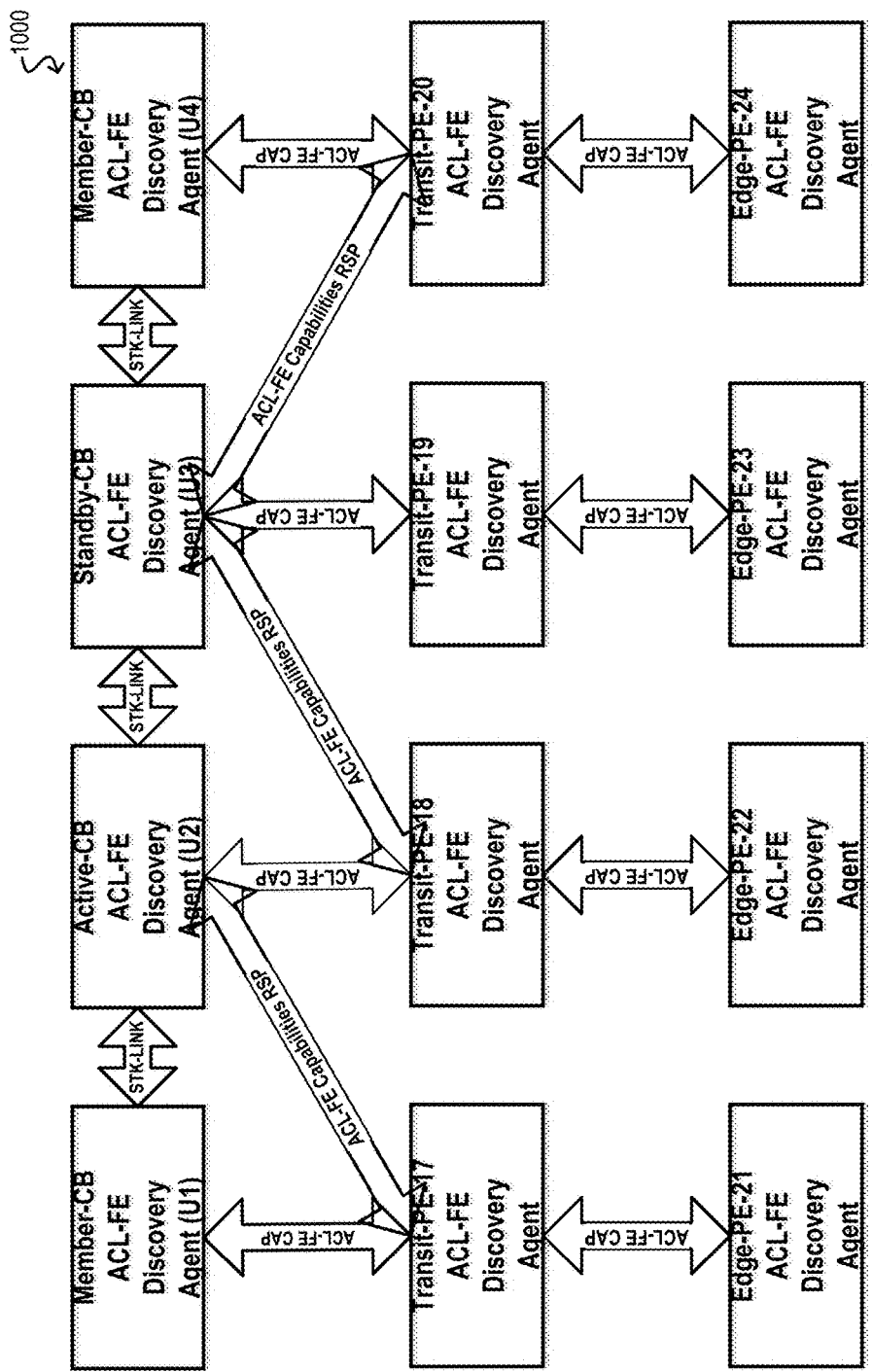
FIG. 10 depicts an example architecture for supporting distributed rule forwarding engine capabilities discovery according to an embodiment.

FIG. 10 depicts a diagram 1000 of an architecture for supporting "Distributed Rule Forwarding Engine Capabilities Discovery" according to an embodiment.

As extended bridging based on the IEEE 802.1BR standard has started gaining popularity both in campus networks and VDC deployments, the virtual bridging topology is expected to grow to several hundreds of Plug-'n'-Play model PE devices that would collectively support several thousand customer facing Ethernet data ports. Due to cheaper hardware and less complex software operations on PE devices, not all PE devices are required to have homogeneous capabilities.

In order to utilize capex and opex savings from this market opportunities, the service providers and network operators may want to plan scalable network growth at the customer edge, by providing heterogeneous PE devices with variable port densities and variable link speed capabilities to meet specific customer's service demands in a more economic manner.

With heterogeneous capability PE devices, their TCAM processor capabilities needed for ACL rules processing and many other forwarding engine hardware data-path capabilities, e.g. number of Unicast Traffic Queues and Multicast Traffic Queues on an Egress Port, number of Traffic Metering profiles supported by the hardware etc. would also vary.

Thus the master CB device should to be more intelligent to understand the TCAM processor capability limitations of various PE and also member CB devices that might be present in an extended bridge topology, before proceeding to provision any ACL rules request on the PE(s) or member CB devices. This can be achieved as an extension to the IEEE-802.1BR CSP based discovery process, after the basic CB-PE topology discovery is completed first. In other words, after the initial CB-PE pair discovery, the master CB device can send a forwarding-engine capabilities request to each of the discovered PE devices and also to the member CB devices.

Upon receiving such requests, the PEs and member CBs can respond to the master CB by indicating whether certain forwarding engine capabilities are supported or not, e.g. whether IPv6 packet filtering is supported and if yes then what is the maximum number of IPv6 filters that the forwarding engine's TCAM can support.

Upon receiving these responses from all operational PEs and member CBs, the master CB can build a forwarding resources capability matrix (FRCM) data structure in its local memory. The FRCM can be implemented as a rectangular 2-dimensional array in which each row indexed by the Unit ID represents a PE device or another member CB device, and each column represents a capability parameter. The array element at a specific row and column represents the capability parameter value discovered from a PE device or member CB device.

The significance of the capability parameter in FRCM is that when a ACL rule provisioning request is received from a CLI or SNMP user, an internal L2/L3 bridging/routing application, or an external OpenFlow controller, the ACL sub-system at the master CB node can perform a lookup into FRCM and run a decision making procedure to determine whether or not the destination PE device or member CB device has enough TCAM processor capability to program the user's ACL rule request on that device's forwarding engine.

The master CB can also maintain another in-memory rectangular matrix referred to as the forwarding resources availability matrix (FRAM). FRAM can be identical in layout with the FRCM, but it can hold the remaining available TCAM resources of all the PE devices and CB devices.

As various types of ACL rules are programmed or de-programmed on the destination PE or member CB devices of the extended bridge, the available resources of the TCAM on those devices will change. The master CB can update the FRAM matrix based on these changes to reflect the actual TCAM resources available on each PE and member CB device of the bridge at any given time.

This validation of ACL rule provisioning requests via lookups into the FRAM and associated decision making process enables predictable behavior of ACL rules services on the extended bridge.

3.2.6 Virtual Rule Provisioning Architecture

Figure 11:
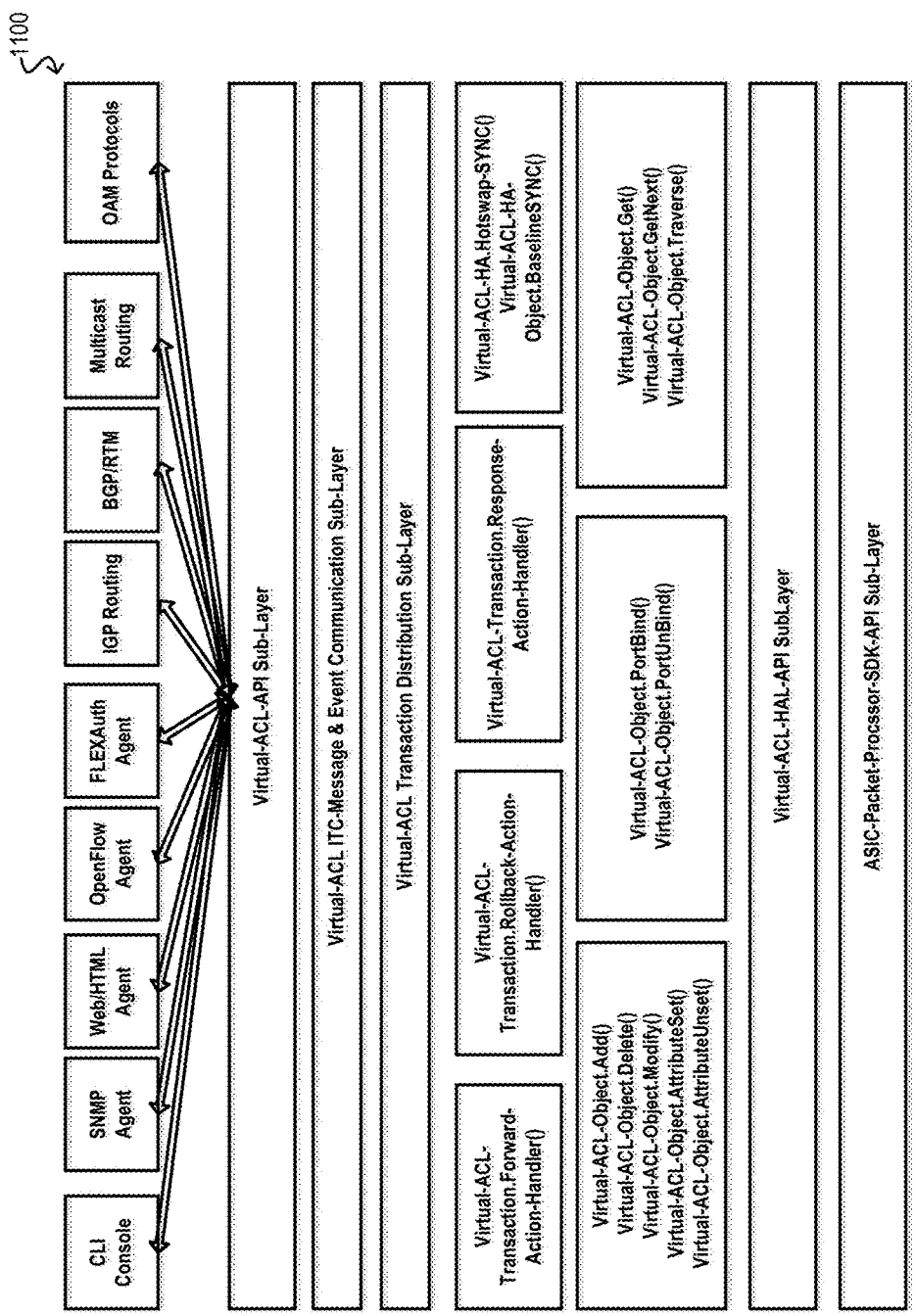
FIG. 11 depicts a virtual rule subsystem architecture according to an embodiment.
Figure 12:
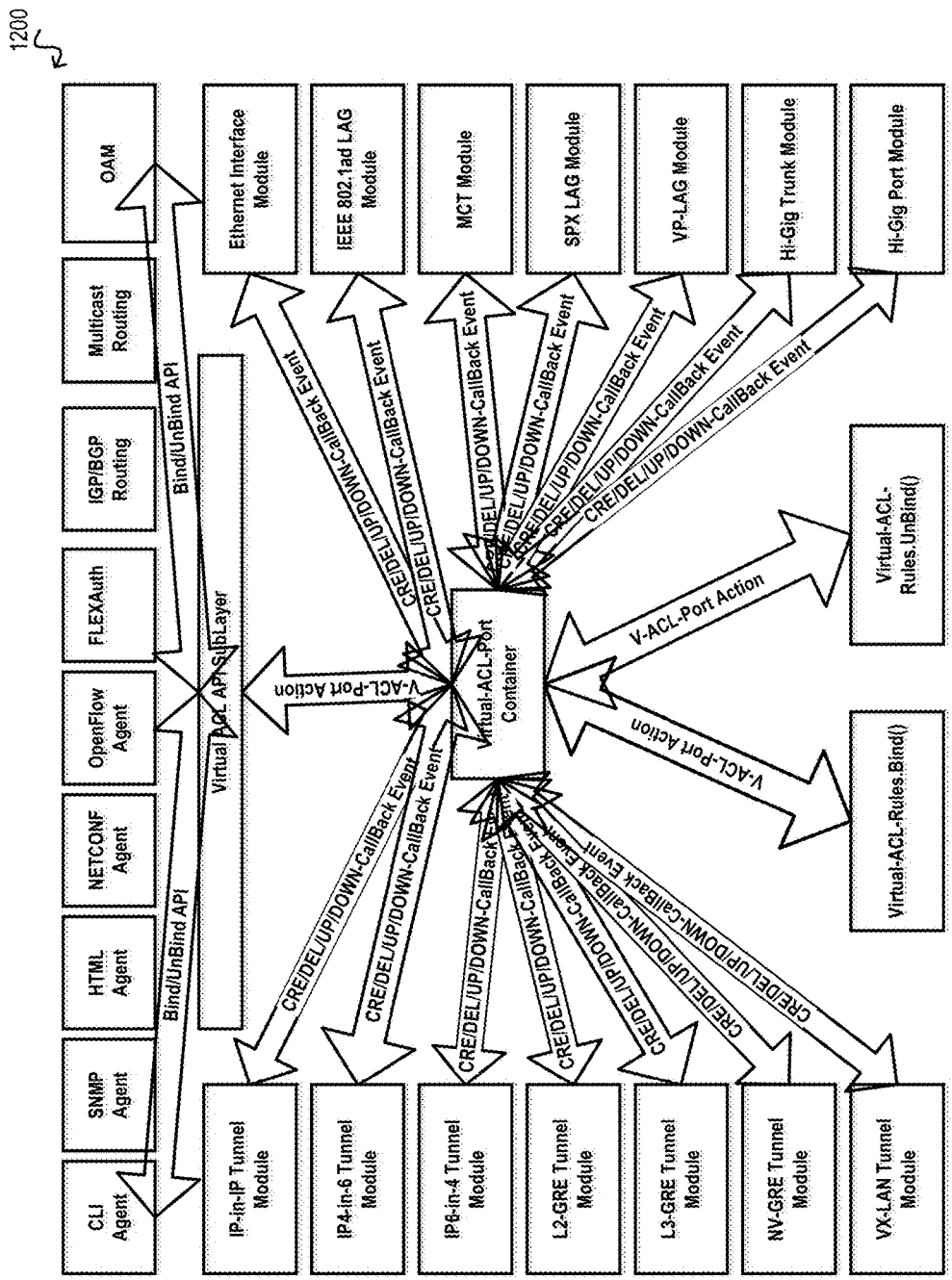
FIG. 12 depicts a virtualized rule port-binding architecture according to an embodiment.

FIG. 11 depicts a virtual rule subsystem architecture 1100 and FIG. 12 depicts a virtualized rule port-binding architecture 1200 according to an embodiment.

All of the TCAM devices of CB and PE nodes in an extended bridge can be represented as a single virtual TCAM device on the master CB that collectively represents the bridge's overall aggregated ACL rules processing capabilities and TCAM capacity. In order to satisfy the processing and storage needs of multiple different types of ACL rules required by multiple different types of routing/switching applications, the physical TCAM device's storage can be partitioned into blocks of different widths, e.g. single width, double width or quadruple width etc. Also TCAM device's storage can be partitioned into blocks which can accommodate 512 rules in each block. Larger rules may need more space (such as, e.g., IPv6 ACL rules, which need more space due to longer IPv6 addresses or ACL rules for IPv4 or IPv6 multicast addresses).

Thus the single aggregated virtualized representation of TCAM devices of all CB and PE devices of the extended bridge can allow for easy identification of free unused as well as used TCAM blocks of different widths and their counts as a global TCAM blocks pool.

In the distributed ACL rules provisioning architecture, there is a software component 'Virtualized TCAM Resources Manager (VTRM)' which runs in every CB and PE device of the extended bridge. This software component is responsible for tracking and managing the available TCAM resources on every CB and PE device. The VTRM components across the CB and PE devices can function in a distributed master-slave manner. In other words, the VTRM instance that runs on the master CB is referred as Master-VTRM and the instances that run on other member CB and PE devices are referred as Slave-VTRM in this document.

In addition to tracking and managing the master CB's TCAM, the Master-VTRM also keeps track of the resource utilization of TCAM devices in remote member CB and PE devices by communicating with the Slave-VTRM instances running on those remote devices.

The master CB maintains a map of free as well as allocated TCAM resource blocks of various supported block widths for all CB and PE devices in the extended bridge. This map is referred to as Virtual-TCAM (V-TCAM), which is a logical aggregated representation of physical TCAM resources of all CB and PE devices in the bridge.

When a network administrator submits, via e.g. CLI or SNMP, requests for new ACL rules provisioning or de-provisioning of existing ACL rules to/from one or more CB and/or PE devices, the request is validated by the Master-VTRM against the available TCAM resources. Since the Master-VTRM has the global visibility of TCAM resources of all CB and PE devices of the extended bridge, it can check whether or not there are sufficient TCAM resources available for the requested ACL rule types. The Master-VTRM maps the received ACL provisioning request to a list of destination member CB and PE devices.

If there are not enough TCAM resources available for the requested ACL rule type at the destination CB and/or PE devices, the received ACL provisioning request can be rejected and an error response can be returned to CLI or SNMP User. However if there are sufficient TCAM resources available, then the Master-VTRM makes a temporary reservation of the required TCAM resource against the V-TCAM.

After the ACL rules are successfully provisioned on the destination devices with the help of the Distributed Transaction Manager (DTM), the Master-VTRM will mark the reserved TCAM resources as allocated on the V-TCAM resource map that is maintained at the master CB device.

If however the ACL rules provisioning attempt has failed on one or more destination member CB or PE devices, then the ACL rules will not be programmed on any of the CB or PE devices, and hence the Master-VTRM will un-reserve the temporary reservations so that those TCAM resources can be used for satisfying future ACL rules provisioning requests.

Similarly, when ACL rules de-provisioning requests are received from CLI or SNMP users, the Master-VTRM will locate the TCAM resources used by these ACL rules in the V-TCAM. After the ACL rules are successfully de-provisioned at the destination member CB and/or PE devices, the Master-VTRM will free the previously allocated TCAM resources, which can again be re-used by ACL rules in future provisioning requests.

When ACL rules are provisioned for traffic engineering purposes, there will be accompanying traffic profiles. These traffic profiles will contain traffic metering/policing parameters based on the IETF standard (RFC2697) in the case of Single Rate Three Color Marker (srTCM) or based on IETF standard (RFC2698) in the case of Two Rate Three Color Marker (trTCM).

Thus, in the case of ACL rules provisioning request with traffic profiles, the Master-VTRM will validate if the requested traffic metering (srTCM or trTCM) can be supported by the destination member CB or PE devices. If this validation fails, then the ACL rules provisioning request can be rejected; otherwise, it is distributed towards the destination via DTM.

4. Distributed Event Monitoring and Information Collection/Reporting

In addition to the distributed rule provisioning and virtualized TCAM management described in the preceding sections, certain embodiments of the present disclosure provide techniques for (1) performing distributed event monitoring at the PEs of an extended bridge, (2) collecting information pertaining to the monitored events, and (3) efficiently rolling up/reporting this information to the CB level. For example, in one embodiment, each PE can monitor for and collect statistics pertaining to the packet classification rules that are provisioned from the master CB per workflow 300 of FIG. 3 (e.g., the number of times each rule is "hit" by an ingress or egress packet). In other embodiments, each PE can monitor for health status, device faults, system log events, debug events, or other types of events/actions. The PE can then report information regarding these events to the CB core stack for, e.g., presentation to a user/administrator, initiation of a corrective action by the master CB (e.g., unit reboot), or other purposes.

4.1 High-Level Workflow

Figure 13:
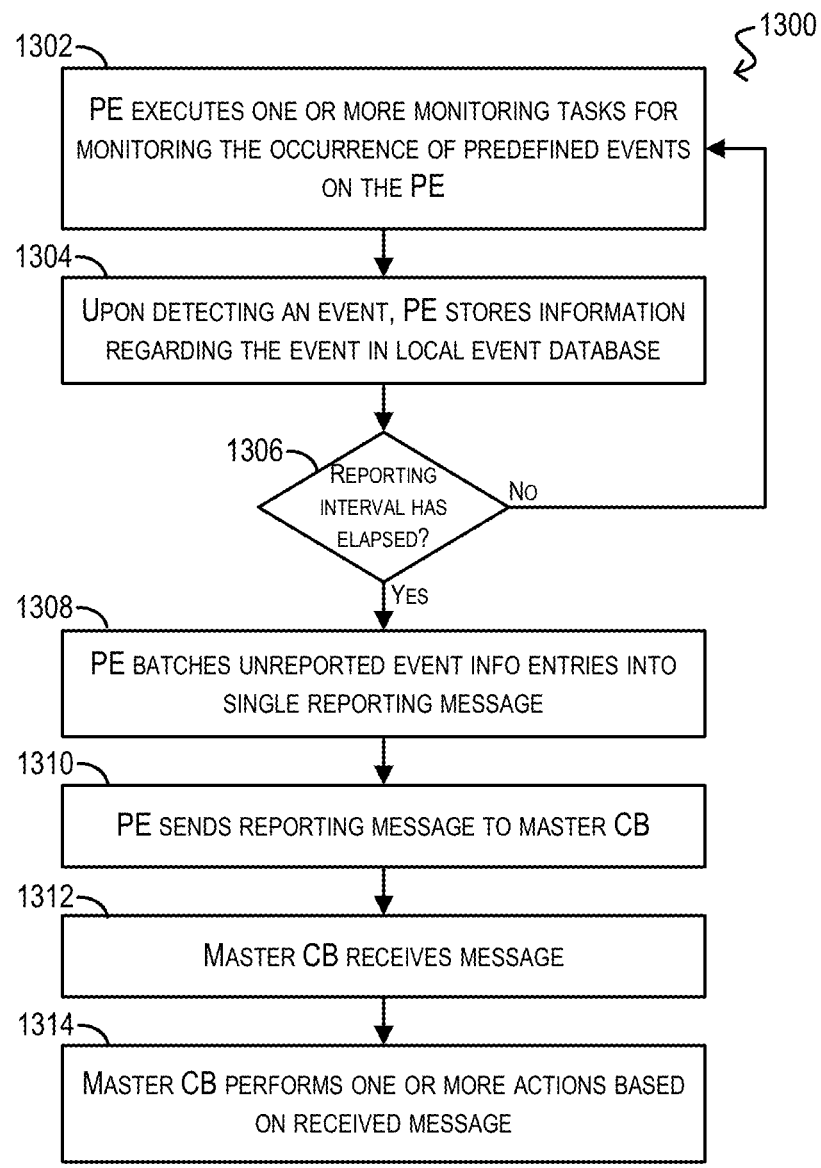
FIG. 13 depicts a workflow for performing distributed event monitoring and information collection/reporting according to an embodiment.

FIG. 13 depicts a high-level workflow 1300 that may be performed by the PEs and CBs in an extended bridge for performing distributed event monitoring and information collection/reporting according to an embodiment.

Starting with block 1302, each PE in the extended bridge can execute one or more monitoring tasks for monitoring for the occurrence of certain predefined events or other actions on the PE. Such predefined events can include, e.g., events pertaining to the operation of the data plane of the device (e.g., TCAM rule hit, incrementing of packet counters, etc.), hardware health/fault events (e.g., deviation of a hardware operating parameter, such as temperature, fan speed, voltage, etc. beyond a threshold), software health/fault events, preconfigured debugging events, and so on.

In certain embodiments, the specific manner in which the monitoring at block 1302 is performed can be configured via one or more user-defined monitoring policies that are, e.g., entered directly on the PE device or is provisioned by the master CB.

Further, each PE can run one monitoring task instance per event to be monitored, such that multiple events can be monitored in parallel.

After identifying the occurrence of a predefined event, the PE can store information regarding the event in a local event database of the PE (block 1304). The exact content of this information entry will vary depending on the type of the event.

Then, at block 1306, the PE can determine whether a preconfigured reporting time interval has passed. If not, the PE can return to block 1302 to continue monitoring for additional events. However, if the reporting time interval has passed, the PE can batch together the unreported event information entries in the local event database (i.e., entries created during the most recent reporting interval) and can send the batched entries in a single reporting message to the master CB (blocks 1308 and 1310). By batching together the most recent event information entries in this manner, the PE can reduce the amount of internal bridge bandwidth that is needed for the transmission of these messages.

In some embodiments, as part of the block 1310, each transit PE along the path from the PE to the CB core stack can aggregate the reporting messages it receives from downstream PEs (i.e., PEs rooted at the transit PE) and can send a single, consolidated reporting message upstream to the master CB. This aggregation can further minimize bandwidth consumption within the extended bridge. Similarly, in cases where the PE is rooted under a different parent CB than the master CB, the parent CB can aggregate all of the reporting messages received from the PE tree rooted at that CB and can send a single, consolidated reporting message to the master CB.

At block 1312, the master CB can receive the reporting message rolled up from the PE. Finally, at block 1314, the master CB can take one or more actions based on the received message. For example, in one embodiment, the master CB can generate an alert or otherwise inform a user of the content of the message. This may occur if, e.g., the message pertains to an event that requires immediate human intervention (e.g., a critical hardware fault).

In another embodiment, the master CB may attempt to autonomously perform one or more actions in response to the event information included in the message. For example, if the message identifies a software fault on a given PE, the master CB may send a command to that PE to reboot or reset itself in an attempt to correct the software fault.

In yet another embodiment, the master CB may simply store the event information in a local database (or transmit the information to a remote machine/server, such as an external NMS system or SYSLOG server) for use or reporting at a later time. This may occur if the events included in the received reporting message are merely informational in nature (e.g., operational statistics, etc.).

It should be appreciated that workflow 1300 is illustrative and various modifications are possible. For example, although workflow 1300 indicates that each PE transmits reporting messages to the master CB at predefined time intervals, in other embodiments the PE may send out the reporting messages based on other criteria. One such criterion may be, e.g., the number of unreported event information entries in the PE's local event database (such that one reporting message is sent out for every X events). In some cases, the master CB may also explicitly poll each PE to report out its most recent events.

As another example, while workflow 1300 indicates that each PE waits to batch multiple event information entries into a single reporting message, in some embodiments the PE may send out each event information entry in its own message, as the events occur. This may be preferable in situations where, e.g., it is important for the message to be received by the master CB with as little latency as possible. One of ordinary skill in the art will recognize other variations, modifications, and alternatives.

4.2 Implementation Details

The following sub-sections discuss various low-level details and workflows that may be used to implement specific applications/use cases of the high-level event monitoring and information collection/reporting framework described above.

4.2.1 Distributed Fault Monitoring and Reporting

In this use case, each bridge unit can execute a fault monitoring task that is responsible for monitoring for any logical for physical faults in the unit. In addition, each PE can execute a fault reporting task that is responsible for periodically reporting detected fault indications to the CB level. This periodic reporting can be triggered based on a configurable reporting threshold policy. The fault reports can be propagated from edge PEs or transit PEs to their attached (i.e., parent) CB via an appropriate protocol (e.g., PE-CSP protocol). Upon receiving fault reports from its child PEs, each non-master CB can forward the fault reports to the master CB via a core stack protocol.

4.2.2 Distributed Voltage/Temperature Monitoring

In this use case, each bridge unit can execute a voltage/temperature monitoring task that is responsible for monitoring the voltage margining and temperature sensor data of the unit via a hardware abstraction layer (HAL) API of the unit's I2C drivers. This task can be configured to operate based on user-defined policy and can maintain a statistical quantization of the monitored data.

The quantized data can be compared against one or more policy thresholds in order to decide if the voltage operating condition is normal or if a fault condition exists. This fault condition can be used as an input to the fault monitoring task, so that the master CB or another CB can instruct the bridge unit to shut down or reset/reboot.

The voltage monitoring and reporting frequency parameters are configurable via CLI or SNMP. The master CB can provision these parameters to all the CB and PE devices after those devices are discovered in the extended bridge topology.

The individual member CB and PE devices can report the monitored voltage data to the master CB. A network administrator can view, via a CLI display command or SNMP MIB, the monitored Voltage data of all CB and PE devices that are available at the master CB.

4.2.3 Distributed Fan Speed Monitoring

Depending on traffic processing load, each of the CB and PE nodes will generate some amount of thermal energy during its course of operation in the extended bridge. Individual CB or PE nodes are typically equipped with intelligent fan control hardwire and firmware, which can detect thermal sensors based temperature fluctuations. For example, an intelligent fan controller can increase or decrease fan RPM speed to trigger a cooling effect when the temperature in the CB or PE device increases.

The in-built hardware fan controllers on the CB or PE devices can only control the temperate of the local device by increasing or decreasing the fan speed depending on need. If for some reason the temperature level rises beyond allowed maximum threshold for the system, the local device can reboot and re-start traffic forwarding operations.

However, if some CB and/or PE devices receive an unexpectedly high rate of traffic broadcasts due to, e.g., a DOS/DDOS attack or a broadcast storm because of another device's hardware malfunctioning or mis-forwarding of traffic, then this automatic fan speed adjustment alone will not be able to fix the network mal-functioning or network attack.

To address this, the software control plane on CB and PE devices can run a fan monitor task that performs periodic temperature monitoring and reporting of the collected data to its counterpart task in the master CB device. This task can monitor temperature gradient fluctuations in each PE/CB based on configurable maximum temperature thresholds and time intervals for temperature changes reading and reporting.

In one embodiment, the fan monitor task can maintain a running average value of the monitored temperature changes data on the PE/CB by using a standard 'Exponential Weighted Moving Average' calculation mechanism, which produces a smooth average value. This average value is reported back to the master CB based on configured reporting intervals.

The master CB can maintain the temperature average reports received from all the CB and PE devices that are operational in the extended bridge. These reports can be displayed at CLI console by the network administrator or via SNMP management for analytics purposes and also for discovering and troubleshooting of any device or network link malfunctioning in the bridge.

Alternatively, the master CB can be configured for network policy-based automatic troubleshooting and network traffic fault repairs. In this mode of operation, the master CB can scan through all the received EWMA averaged temperature reports from various PE and member CB devices to locate any abnormally high rate of temperature gradient fluctuations and correlate those with the configured customer traffic flow's maximum rates and also control plane traffic flow's maximum rates.

If the temperature gradient fluctuations for a particular CB or PE device are found to be very high compared to the configured traffic flow's traffic engineering (srTCM or trTCM) maximum rates, then it might imply neighboring CB or PE devices are not properly enforcing traffic metering or traffic shaping or congestion control functions and hence traffic engineering configurations on those devices need to be inspected and re-programme with corrected traffic control parameter values.

If a temperature gradient anomaly is detected on edge PE devices, then traffic engineering parameters and traffic classification ACL rules can be reviewed against what was configured originally by the master CB and any discrepancy found in the data plane provisioning status can be corrected by re-programming rules with correct values for the traffic control parameters, e.g. srTCM (IETF RFC2697) or trTCM (IETF RFC2698).

If the temperature gradient anomaly indicates an excessive high volume of traffic is being forwarded to the device as a result of unfairly biased load distributions from a multi-homing PE device, load balancing policies and/or load distribution algorithms in-use can be re-visited and a fairer distribution mechanism can be enabled to rectify the anomalous conditions.

4.2.4 Distributed Power Over Ethernet Monitoring

In this use case, each bridge unit can execute a Power over Ethernet (PoE) manger that is responsible for managing PoE CLI configurations, SNMP MIB object Get/Set handling, PoE hardware provisioning, monitoring PoE status, and fetching PoE statistics by communicating with an appropriate HAL task.

4.2.5 Distributed Statistics Monitoring and Reporting

In this use case, each bridge unit can execute a statistics monitoring task that is responsible for monitoring (i.e., collecting) statistics periodically from the hardware counter tables of the unit. This periodic collection can be triggered based on a configurable collection interval policy. The collected statistics objects can be maintained in a local cache of each PE unit.

In addition, each PE can execute an event reporting task that is responsible for periodically reporting generated events (e.g., collected statistics). The periodic reporting can be triggered based on a configurable reporting threshold policy.

4.2.5.1 Statistics Collection Policy

The master CB can collect statistics of various classes of traffic from the PE nodes. In order to collect these statistics, the CB can configure statistics collection policies on the PEs. A statistics collection policy may used to configure the following two parameters:

Collection interval—This is used to decide how frequently the statistics are to be collected from the data plane forwarding engine.

Reporting interval—This is used to decide how frequently the statistics are to be reported to the C.

In one embodiment, the collection interval may be configured to be a smaller value than the reporting interval, so that multiple rounds of statistics are collected before reporting. These data can be used at the CB to calculate average, minimum and maximum values of statistics parameters. These data can also be used to calculate the average, minimum and maximum of the changes since the last time statistics were collected.

At the PEs, statistics can be collected and reported for the following traffic points:

Up-Link ports (H2N) TX and RX directions at both transit and edge PEs

Down-Link ports (N2H) TX and RX directions at both transit and edge PEs

4.2.5.2 Statistics Threshold Policy

The statistics threshold policy can used by a statistics monitoring task to check when the thresholds are crossed. Both minimum and maximum threshold values for different classes of statistics can be configured.

The statistics monitoring task may trigger an event generation when the threshold values are crossed. In the case of a minimum threshold, when the monitored statistics parameter's value falls below this limit, an event can be generated. In the case of a maximum threshold, when the monitored statistics parameter's value exceeds this limit, an event can be generated.

A statistics threshold policy can be configured for the following type of objects:

Up-Link ports (H2N) TX and RX directions at both transit and edge PEs

Down-Link ports (N2H) TX and RX directions at both transit and edge PEs

Down-Link ports (N2H) TX directions at CB

Control plane CPU utilization at CB, transit PEs, and edge PEs

Temperature sensor data at CB, transit PEs, and edge PEs

Voltage monitoring data CB, transit PEs, and edge PEs

4.2.5.3 Statistics Collection Agents

A statistics collection agent running on each CB/PE is responsible for periodically collecting statistics from data plane packet forwarding entities, I2C based peripheral devices, temperature sensors, voltage monitors, optical transceivers, management ports etc. based on a collection policy definition. The collection agents can run in distributed manner, with a master/slave architecture.

A master collection agent (MCA) can run on each CB in the extended bridge and can aggregate the statistics data reports received from PEs. A slave collection agent (SCA) can run on each PE and can collect statistics data from the PE's data plane forwarding engine and peripheral devices, periodically at every collection interval based on the policy definition. The collected statistics data can updated in an in-memory table of the PE. In certain embodiments, an instance of the SCA can also run on the CB nodes for collecting local device statistics.

Both the MCA and SCA can run as low priority independent OS tasks (e.g., POSIX thread). An MCA can communicate via a PE-CSP IPC mechanism with the SCAs of all PE nodes in the same extended bridge domain. The MCA of a CB node "CB-1" generally cannot directly communicate with the PE nodes attached to another CB node "CB-2."

An MCA can aggregate the unsolicited periodic statistics reports received from the SCA(s) attached to the PE domain of its CB. An MCA can also poll the SCA(s) of its CB's domain and can aggregate the statistics data received via poll responses.

4.2.6 Distributed Health Monitoring

In this use case, a number of different tasks can be run on the CBs and/or PEs of an extended bridge to perform health monitoring within and across the nodes of the bridge.

4.2.6.1 Intra-Node Health Monitoring Task

For example, in one embodiment, each CB and PE can execute an intra-node health monitoring task that is responsible for periodically monitoring the health status of application tasks running on that node.

Inside a single node, the software architecture can accommodate a health monitoring component (thread/process) that can monitor the health status of every other application software component by periodically polling (i.e., sending a health status request message) and receiving a health status response message. The health monitoring component can have the authority to reset/reboot the system if one or more application software components are non-responsive for a pre-configured number of health status poll cycles.

4.2.6.2 Stacking Domain Inter-Node Health Monitoring Task

In another embodiment, each CB can execute a stacking domain (i.e., core stack) inter-node health monitoring task that is responsible for periodically monitoring the health status of stacking member (i.e., CB) nodes. The master CB can generate periodic health status poll requests sent to member CBs.

In various embodiments, the health monitoring across bridge nodes can function in a master/slave fashion. For example, a master health monitoring agent running on each parent CB can periodically poll for health statuses from slave health monitoring agents running on attached PEs. The slave health monitoring agent can monitor and maintain an aggregated health status of all the applications running on the host PE.

For efficiency reasons and minimization of health message communication bandwidth consumption, the transit PEs in a PE tree can function as intermediate health monitoring masters and can aggregate the health monitoring statuses of the sub-tree nodes rooted at this node. Thus the tree root (i.e., parent CB) master monitor can poll health Status either from the root of the sub-tree underneath or a directly attached leaf node (i.e., edge PE).

In the case of an extended bridge with multiple PE trees (i.e., a PE forest), the CB at each tree root can maintain an aggregated health status view of the entire PE tree underneath that CB. The master CB of the core stack can periodically poll for health Status only from the standby/member CB nodes, which can respond to the health status polls based on their aggregated health status views of their respective PE trees.

4.2.6.3 PE Domain Inter-Node Health Monitoring Task

In another embodiment, each PE can execute a PE domain inter-node health monitoring task that periodically monitors the health status of PEs. The CB node can generate period health status poll requests sent to transit and edge PE nodes.

4.2.7 Distributed Graceful Restart Services 4.2.7.1 Graceful Shutdown

"Graceful shutdown" in a distributed switching network refers to an orderly shutdown of all switching elements without incurring any abrupt shutdown behavior or abrupt faults or alarm generation. Thus, in a stacking system, an orderly shutdown would mean that the master unit sends a shutdown command to all member units and standby units before shutting down the local node itself.

When the distributed switching network is an extended bridge comprising a PE forest, the master CB can send a shutdown command to all other CBs, which are roots of PE trees. Each root CB can then send shutdown commands to the transit and edge PEs beneath it before shutting down itself.

4.2.7.2 Graceful Disable

"Graceful disable" in a distributed switching network refers to an orderly disabling of all switching elements.

When the distributed switching network is an extended bridge comprising a PE forest, the master CB can send a disable command to all other CBs, which are roots of PE trees. Each root CB can then send relay this command to the transit and edge PEs beneath it (in the form of, e.g., "pe-disable" commands).

4.2.7.3 Graceful Restart/Reload

"Graceful restart/reload" in a distributed switching network refers to an orderly restart/reload of all switching elements.

When the distributed switching network is an extended bridge comprising a PE forest, the master CB can send a restart/reload command to all other CBs, which are roots of PE trees. Each root CB can then send relay this command to the transit and edge PEs beneath it (in the form of, e.g., "pe-restart/reload" commands).

4.2.8 Extended Bridge System State Database (EB-SSD)

In one set of embodiments, an extended bridge system state database (EB-SSD) may be used for storing all the configured as well as learned protocol/application states of every protocol/infrastructure-application process in the extended bridge. The states of every protocol/application process can be modeled as abstract objects which are stored in EB-SSD tables.

Rows in these EB-SSD tables can represent instances of protocol/application state objects, which are created, deleted or modified as a result of:

Extended bridge provisioning/de-provisioning actions via CLI Commands
 SNMP MIB Table SET Actions
 NETCONF YANG model actions
 Protocol state changes which are dynamically learned, are also written in EB-SSD, e.g.
  EB domain discovered active topology
  OSPF Neighbor Table
  IS-IS L1 Adjacency Table
  IPv4/IPv6 Routing/Forwarding Tables
  Multicast Forwarding Cache Tables
 Physical component status changes, e.g. Port Operational state Up/Down, Member Unit Join/detachment
 FSM state changes during FSM run triggered by received internal or external events 4.2.8.1 EB-SSD Event Notification When an application process writes its state changes onto the EB-SSD, these writes are propagated to the subscribed applications as asynchronous event notifications. As an example, when the stacking feature is disabled on a stacking enabled port via CLI console, the interested component processes may subscribe with EB-SSD Manager to receive such event notifications. The component processes after receiving such notifications may read additional objects/data from the EB-SSD and may process this event trigger by running through their internal FSMs.

This asynchronous event notification mechanism of EB-SSD can be utilized to eliminate global data structure sharing across many of the protocol/application/infrastructure functionalities that are prevalent in existing stacking software architectures.

This centralized database approach to propagating state changes as event notifications throughout the system reduces inter-component global data sharing and the risks of error, improving software quality and component design flexibility.

The operating system running on an extended bridge can support a series of database table manipulation API(s), which can be invoked by the OS application processes, including SNMP, CLI and NETCONF agents for updating/querying object data or object data change event registrations/notifications. These APIs would enable separation of database representation of object data models from the in-memory representation of object data structures inside the protocol/application processes.

The abstract object model for each database table can be represented using an XML schema. A software tool in combination with an XML parser/translator can be used to automatically generate EB-SSD table management API code.

This automatic generation of EB-SSD APIs eliminates error-prone manual coding, and also increases the velocity of new protocol feature addition or existing protocol feature enhancements.

Since these APIs allow database management using abstract object models, external users, network administrators or customers would also be able to utilize these APIs for subscribing to events and receiving event notifications from the EB-SSD.

An external application running on Linux Bash shell can also perform provisioning/de-provisioning of extended bridge features or start/stop periodic monitoring/fetching of object data from EB-SSD for advanced level troubleshooting/debugging. This amounts to automated provisioning and/or monitoring.

Figure 14:
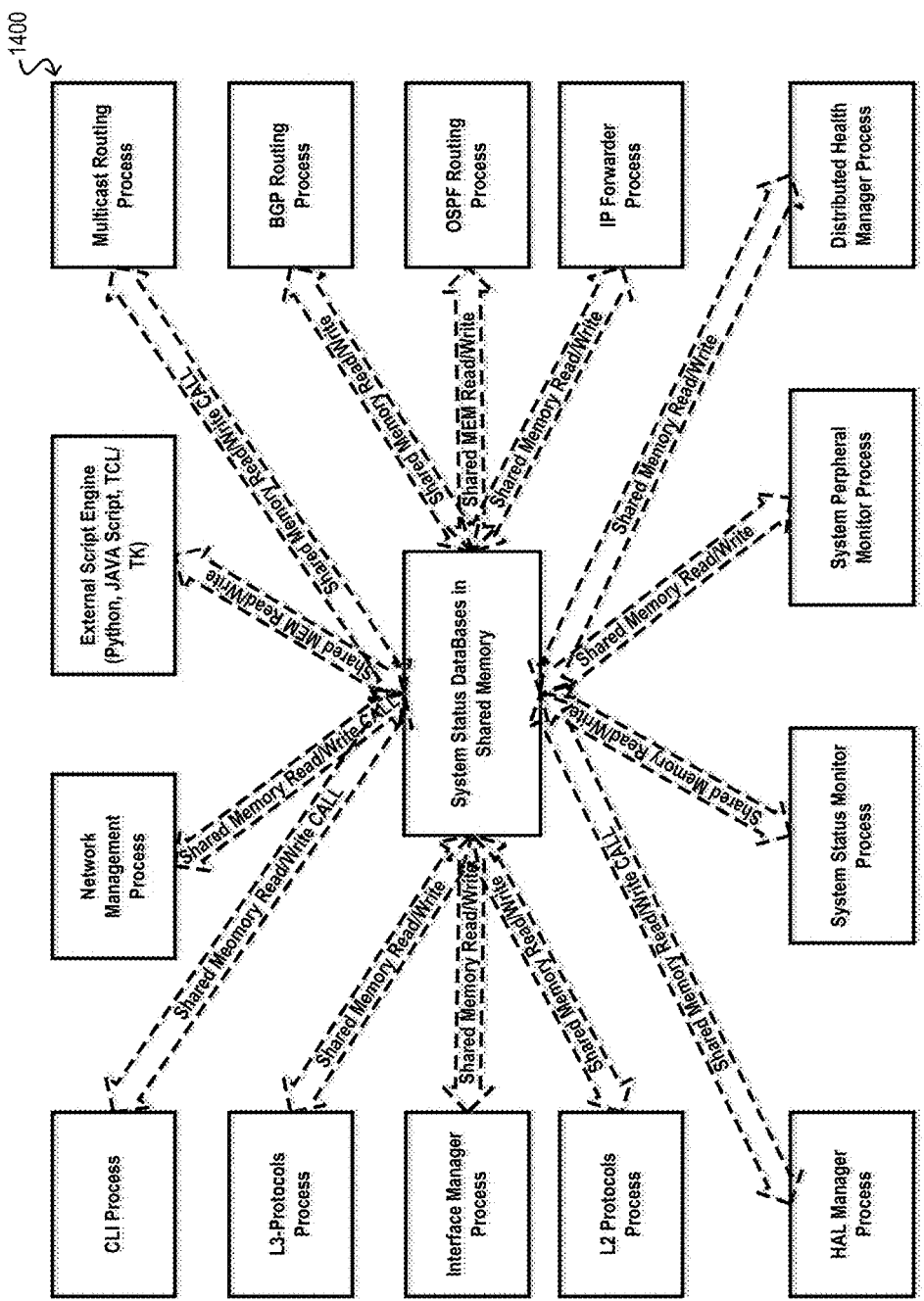
FIG. 14 depicts example interactions between an extended bridge system state database (EB-SSD) and various operating system processes according to an embodiment.

FIG. 14 depicts a diagram 1400 of example interactions between the EB-SSD and various OS processes.

4.2.9 Distributed System Logging Services

In this use case, system log events that are generated by application services running on the PEs in an extended bridge (e.g., application services offloaded from the CBs of the bridge) can be collected and reported to the master CB. In this distributed system logging architecture, the master CB can run a master SYSLOG agent, the standby CBs can run standby SYSLOG agents, and the member CBs and the PEs can run slave SYSLOG agents.

4.2.9.1 Master SYSLOG Agent

The master SYSLOG agent maintains system log transaction records received from slave SYSLOG agents running on PE devices or member CBs. The master SYSLOG agent also co-ordinates to dispatch the SYSLOG transactions to one or more external NMS systems or external SYSLOG servers when those are configured.

When a query is received from network management applications such as CLI, SNMP or NETCONF, the master SYSLOG agent searches a locally maintained SYSLOG database and returns the matching transactions.

If the extended bridge includes a standby CB for resiliency purposes, the master SYSLOG agent can synchronize all updates of the SYSLOG transactions with the standby SYSLOG agent running on the standby CB.

4.2.9.2 Standby SYSLOG Agent

The standby SYSLOG agent maintains system log transaction records received as synchronization/check-pointing messages from the master SYSLOG agent. However, generally speaking, the standby SYSLOG agent does not respond to any external queries received from network management applications such CLI, SNMP or NETCONF until a switchover occurs, the master CB goes down, or upon an operator initiated graceful switchover.

After a switchover, the standby SYSLOG agent on the standby CB can assume the role of master SYSLOG agent in order to perform the duties of the master agent.

4.2.9.3 Slave SYSLOG Agent

The slave SYSLOG agent accumulates system log transactions into an in-memory system log database when logging records are produced by various applications running on the host device (i.e., PE or member CB).

In certain embodiments, instead of sending each system log transaction individually, the slave SYSLOG agents can batch a group of transactions and can send this group as a single batched transaction to the master SYSLOG agent running on the master CB. This batching is done to reduce message communication overhead and I/O bandwidth usage of the internal network path(s) from the PE devices to the master CB device. The batching factor can be a configurable parameter for fine-tuning in different PE forest topologies.

4.2.9.4 System Log Database Architecture

In the system log database, system log transaction records can be conveniently stored in two height-balanced trees. An in-memory instance of an AVL-Tree or B-Tree (referred to as the SYSLOG-Index-Tree) can be used to hold the unique indices of the system log transactions. Actual system log transaction data can be stored in a larger B-Tree variant (referred to as a SYSLOG-Data-Tree).

When persistent SYSLOG services are required, the SYSLOG-Data-Tree can be resident in a disk storage system and the SYSLOG transaction data can be searched or updated by using the indices from the SYSLOG-Index-Tree.

When the system receives more system log transactions than a configurable maximum threshold value, some number of oldest transactions generally need to be deleted from the database to make room for newer transactions. Also, in the case of persistent logging, the oldest transaction log entries need to be removed from the disk storage as well. Since the logging process is continuous, when the extended bridge is operational and carrying user's traffic, the accessing and updates of the disk version of the SYSLOG tree can be frequent.

To make the disk update process more efficient, the B-Tree Leaf nodes (which contain the log transaction data) can be written such that the data is aligned with multi-page disk block boundaries. To update the disk version of B-Tree nodes, multi-page disk blocks can be read into memory and, after the updates are done, can be written back as multi-page disk blocks.

When a large scale persistent SYSLOG service is required, the Index tree for SYSLOG transactions can be organized as hierarchical multi-level B-Tree(s), with the topmost index tree being resident in the memory and the intermediate Index Tree(s) of increasing sizes being stored in persistent disk storage.

During system log transaction updates, if the depth threshold of the in-Memory Index-Tree is exceeded, the index updates can be moved to the intermediate Index-Tree(s) in the disk down the hierarchy, with the in-Memory Index-Tree being at the root of the global Index-Tree hierarchy.

This multi-level B-Tree based SYSLOG database is efficient for updates and search of system log transactions using Transaction-ID and Timestamp as the key(s). However, when the SYSLOG service is required to provide a fast response to a multi-dimensional query (i.e. a search request with multiple key(s)), the SYSLOG database can be organized as multi-dimensional spatial database. In this embodiment, a variation of a B-Tree with leaf nodes containing a unique index and a sequence of disjoint intervals can be used to store the SYSLOG transaction records. The interior tree nodes can contain an index and pointers to the next level of child nodes or leaf nodes. The interior nodes are representative of all the intervals of its descendent nodes. Such data structures are referred as a Range Tree in computational geometry literature.

The sequence of intervals at the leaf nodes represent the system log transaction data as a bounding box or multi-dimensional rectangle, which facilitates faster searching of the SYSLOG database using multi-dimensional point query or multi-dimensional range query.

An N-dimensional point query $Qn=<Q1, Q2, Q3, \ldots Qn>$ of data represents a lookup operation to check if the N-dimensional point Qn belongs to a bounded N-dimensional rectangle represented by the fields of SYSLOG transaction data. Similarly, a range query $Rn=<R1, R2, R3, \ldots Rn>$, (where each Rj $1<=j<=n$ is an interval of the form [a, b]) of data represents a lookup operation to check if the N-dimensional rectangle Rn falls within a bounded N-dimensional rectangle represented by the fields of SYSLOG transaction data.

4.2.9.5 Distributed SYSLOG Data Generation and Reporting

The SYSLOG transactions received from the PEs and member CBs are consolidated at the master CB. The member CBs and PE locally collect these SYSLOG transactions and send the transaction data to the master CB.

For a large extended bridge with many PEs, and in particular many cascaded PEs, the communication latency of transferring SYSLOG data from each PE to the master CB can be very high. To address this, a mechanism of batching a number of system log transaction records and sending these records in a single message to the master CB (as mentioned previously) can be used to reduce communication overhead. Further, when high accuracy is not required (e.g., only last n logs are needed by the master CB), system log transaction records can be classified and updates can be aggregated over a period of time before they are sent from a PE member CB to the master CB. In both of these cases, the messaging overhead can be significantly reduced, since the PEs and member CBs themselves generate and send limited log transaction data periodically to the master CB in an unsolicited manner.

In embodiments where the PEs have embedded multi-core host CPU(s), the SYSLOG processing and reporting functions described above can be designed as multi-threaded tasks for faster and parallel execution.

4.2.9.5.1 SYSLOG Reporting Agents

The slave SYSLOG reporting agent is responsible for periodically reporting already collected SYLOG transaction objects that are maintained in the local in-memory database. The periodic reporting is triggered based on a configurable reporting threshold policy. In these embodiments, the master CB can configure the SYSLOG reporting policy parameters on the PEs and also member CBs.

The periodic reporting of SYSLOG transaction objects can be sent from transit PEs or edge PEs to their attached CB via application layer control messages which are transported as extensions to the PE-CSP protocol.

The SYSLOG reporting agents can run in distributed manner, with a master/slave architecture.

4.2.9.5.1.1 Master Reporting Agent (MRA)

The master reporting agent is optional. When enabled, it can run in each member/standby CB and can aggregate the SYSLOG records received from PEs. The master reporting agent can then send the aggregated SYSLOG records to the master SYSLOG agent running on the master CB.

This 2-level SYSLOG reporting scheme facilitates an efficient SYSLOG reporting mechanism. If this 2-level SYSLOG reporting scheme is not enabled or is not available, the slave SYSLOG agents running on the PEs and member CBs can directly send SYSLOG records to the master SYSLOG agent at the master CB.

4.2.9.5.1.2 Slave Reporting Agent (SRA)

A slave reporting agent can run on every PE and member CB, and can report the saved SYSLOG records stored in the unit's in-memory system log database.

4.2.9.5.2 Distributed SYSLOG Reporting Threshold Policy

A SYSLOG reporting threshold policy may be used by the SYSLOG reporting agent to check when reporting thresholds are crossed. Both a minimum and maximum threshold value for the number of SYSLOG transactions and/or the time elapsed can be configured.

The SYSLOG reporting agent may trigger an event generation when a threshold value is crossed. The following are two example threshold values:

Maximum delay threshold—When the monitored elapsed time duration exceeds this limit, an event will be generated.

Maximum Log Records pending threshold—When the number of SYSLOG transactions generated exceeds this limit, an event will be generated.

4.2.10 Distributed Debugging Services

As extended bridges grow in complexity and are used to deliver sophisticated services (e.g., security services, provider bridging, provider-backbone bridging, VPLS, E-VPN, bridging of VPC traffic across public internet backbone via VXLAN or NVGRE, etc,) the ability to effectively debug the units in an extended bridge becomes critically important.

The following sub-sections describe aspects of a distributed debugging manager (DDM) for simultaneously debugging and troubleshooting multiple PE and/or CB devices in an extended bridge from a single administrative management point (typically the master CB). In certain embodiments, this distributed debugging scheme can also be configured to run in an independent and spontaneous manner on PEs/CBs without the centralized control of the master CB.

For example, each PE/CB can be configured to monitor for certain classes of debugging events and collect some pre-specified list of system status or counters, etc. when a particular type of event is detected (e.g., cascade port up/down, CSP neighbor loss/timeout, LLDP neighbor loss/age expiry, etc.).

Another type of event driven troubleshooting is to execute a pre-specified list of configuration parameter provisioning commands when a particular type event is generated/detected.

4.2.10.1 Distributed Debug Service Models

The 'Distributed Debug Management (DDM)' service in an extended bridge can be achieved via configuring, administering, and monitoring various routing/switching devices, network connections, network resource utilizations, fault detection/repairs, resiliencies, quality-of-service achievement, and capacity planning/forecasting. This DDM service has been modeled analogous to representative cloud service models such as:

Infrastructure as a Service (IaaS)
Platform as a Service (PaaS)
Software as a Service (SaaS)
Network as a Service (NaaS)

Specific variants of the DDM service are described in further detail below.

4.2.10.2 Network Level Debug Service Models 4.2.10.2.1 Monitoring Service Models The monitor service activity monitors the delivered service quality with respect to service levels as defined in the Service Level Agreement (SLA) between service customers and a service provider. It utilizes the intrinsic monitoring functions of the system, and is responsible for:

Keeping track of how much use is being made of each service and by which users, i.e. C-VLAN or dynamic flow classified user. This includes verifying if the usage is appropriate.

Defining measurement points and performance indicators related to the service in question, e.g. Service Availability, Service Outage Frequency, Mean Time to Repair, responsiveness of the service provider's network.

Monitoring, analyzing and archiving of these indicator data.

Comparing the actual service quality that is delivered with the agreed service quality.

4.2.10.2.2 Administering and Monitoring Service Security

This involves:

Ensuring appropriate security of debug service user.

Defining and monitoring encryption and integrity technology usage in the service provider's network.

Monitoring and reporting DOS or DDOS attack scenarios.

Monitoring worm signature detection, propagation vulnerabilities and reporting.

Administering and monitoring user and system privileges.

Administering and monitoring network infrastructure including routers, domain name services (DNS), IP addresses, virtual private networks (VPNs), firewalls and content filtering.

4.2.10.2.3 Administering and Monitoring Infrastructure

This involves:

Configuring and maintaining operating systems.

Monitoring and reporting OS page fault rates and thrashing.

Monitoring and reporting OS memory depletion rates and availability changes on threshold crossings.

Flash storage read/write failures, data corruptions and space availabilities of partitions.

Peripheral I/O faults monitoring, Fault monitoring of I2C, USB Power Supplies, Optics Interfaces, SFP/SFP+, QSFP etc.

Temperature Sensor, voltage margining status monitoring and data reporting.

Monitoring of Memory Read/Write Parity errors, DRAM Bank Failures.

TCAM processors usage statistics monitoring and Read/Write failures monitoring.

FPGA device usage statistics and read/write failures monitoring.

ASIC Packet Processor (ASIC-PP) devices memory read/write parity errors.

ASIC-PP to Host-CPU communication failures monitoring.

BCM-PP Pipeline Packet Drops, MMU discards, Policy Threshold Discards, CMIC Drop Counters.

Bridge Unit Host CPU errors.

4.2.10.2.4 Administering and Network Connectivity

This involves:

Monitoring network connections and related capabilities among the service domain routers and switches.

Reporting network connectivity failures.

Monitoring and reporting network connection capabilities including bandwidth availabilities, appropriate bounded delay, Jitter, Quality-Of-Service and reliability for various service domains.

4.2.10.2.5 Administering and Network Services

This involves:

Monitoring and reporting network services such as Firewalls and Load Balancing Efficiencies.

Dynamically administering Load Balancing parameters in the case of asymmetric traffic demands.

4.2.10.2.6 Network Management Services

This involves:

Managing and monitoring network infrastructure using methods, tools and procedures for operation, administration, maintenance and provisioning of network infrastructure.

Keeping track of network resource usage and how they are allocated.

Keeping track of network equipment replacements or upgrades with new functions.

Configuring resources in the network to support a service.

4.2.10.2.7 Service Provisioning in Test and Trial Mode

Trial mode service provisioning allows users/customers to test and verify how well a new service with specific SLA requirements would perform in an extended bridge topology, before actual deployment.

Various network and infrastructure monitoring and status reporting activities can be enabled in this mode to determine the percentage of SLA conformance or violations.

After a pre-defined interval of trial runs, the service can be automatically de-provisioned and a monitoring service can be invoked to check for network connectivity and resource usage returning to prior state, demonstrating elastic behavior of the network.

4.2.10.2.8 Audit Reporting Services

A debug service user can request an audit report generation of an extended bridge's capabilities and services in progress before a new EB service is provisioned to identify if the EB topology and underlying resources is a good fit.

A debug service user can request a periodic audit report generation of the EB capabilities and services in progress after a new EB service is provisioned to verify how well the service is being transported overall through the EB topology.

A debug service user can cancel a periodic audit report generation of the extended bridge.

These services can also creating and send audit reports from run-time environment and/or SYSLOG and event logs.

4.2.10.2.9 Maintenance and Versioning

Maintenance can be required for various reasons including, software defect fixes, software upgrades for feature enhancements or business reasons, etc. The behavior of a service and its underlying resource usage may change due to maintenance, and hence DDM can be used to track software image versioning changes.

4.2.10.2.10 Performance Monitoring

The performance of an EB service can be measured by collecting and gathering the following types of parameters at pre-defined intervals and correlating the data:

Availability of service

Response time to complete service requests

Transaction rate at which service requests are executed

Latency for service requests

Input and output data throughput rate

Number of concurrent service requests (scalability

Capacity of data storage

Number of concurrent execution threads (hyper-threads) available to an application The amount of memory (RAM) available to the running program The data center network IP address pool and/or VLAN range capacity

4.2.10.2.11 Resiliency Monitoring

Resiliency is the ability of a system to provide and maintain an acceptable level of service in the face of faults affecting normal operation.

Resiliency describes the set of monitoring, preventive and responsive processes that enable a EB service to provide continuous operations, or predictable and verifiable outages, through failure and recovery actions. These include hardware, communication and/or software failures, and can occur as isolated incidents or in combinations, including serial multiple failures.

These processes can include both automated and manual actions, usually spanning multiple systems and thus their description and realization are part of the overall EB infrastructure.

Resiliency is determined by the least resilient component in an extended bridge; cost/performance or other factors can limit the extent to which resiliency is possible or practical.

4.2.10.2.12 Reversibility Monitoring

Reversibility allows a debug service user to disable monitoring of one or more EB network or service features and the DDM architecture can delete all the monitored and cached data.

4.2.10.3 PE Infrastructure Level Debug Service Models

The infrastructure level debug service model can allow all debugging/troubleshooting or analytics of PE infrastructure functions to be performed remotely.

PE Physical Machine Operation—PE device's physical layer infrastructure including physical Ethernet ports, various port speeds and Hardware forwarding engine's capabilities, enabled/disabled, host processor's capabilities modified or reset for debugging the behaviors of PE device's platform level functions remotely.

PE Migration—Based on migration policies a PE device can be migrated from one CB's Rooted Tree to another CB's Rooted Tree for observing or debugging the changes in behavior of PE's overall operations, EB services performance and load balancing changes.

PE Scaling—Based on scaling policies and monitored events, PE's configuration including but not limited to number of usable EB Ports, usable PE's Customer Ports, Port Speed/Bandwidth can be increased or decreased to allow observing or debugging the changes in behavior of PE's overall operations and performance changes.

PE Snapshot—A snapshot view of all in-Memory database tables present in a PE device can be sent from the PE device to Master CB node for locating and analyzing any inconsistencies in the PE's expected operational behavior.

PE Configuration Cloning—One PE's configuration can be cloned and applied onto another PE for observing functional and operational behavior changes and comparison based analysis and troubleshooting.

PE Backup—PE's running configuration can be saved in a backup area either in FLASH disk or on a remote TFTP server, before applying a new configuration to observe the changes in functional and operational behaviors and also to observe changes in overall performance. When the debugging and troubleshooting is done, the running configuration can be restored by copying from the saved backup storage.

PE Time Synchronization—PE's times on the system clock should be synchronized with the time from another PE device or a CB device, to observe the functional and operational changes as a part of debugging.

PE Image—PE device should allow booting with a specific image version which may or may not be same as any other PE is running. This would allow observation of PE's functional and operational behaviors, in different image versions as a part of debugging and troubleshooting.

PE Storage Migration—In order to debug and troubleshoot Flash disk storage capability issues, the existing storage used for startup configuration files, boot images and crash-dump files need to be temporarily migrated to remote server or to a CB with sufficient additional storage capacities. After the debugging session is finished, the migrated storage should be brought back to the local PE's Flash storage areas. The PE's debugging feature must allow such operations seamlessly.

PE Storage Snapshot—PE's debugging capabilities would allow capturing a snapshot view of the current utilization of PE's Flash Disk storage by different types of file systems resident on the Flash disk. This captured snapshot view can be sent to the Master CB for analyzing and debugging of PE's storage related issues.

PE Storage Backup—PE should allow taking a backup of all the files resident in PE's Flash disk storage. The backup should be usually stored on a remote server, before performing a storage related debugging or troubleshooting. After the debugging is done, PE's storage are files can be restored from the backup saved in remote server.

PE I/O Performance—Port Speed/Bandwidth can be increased or decreased on PE's customer Ports and also on internal Ports that run IEEE-802.1BR Port-Extension CSP protocols, to allow observing or debugging the changes in behavior of PE's overall operations and performance changes.

PE Network Policy and Firewall Migration—To observe the changes in the functional and operational behaviors of PE's IEEE-802.1BR control plane and also customer traffic forwarding, the network policies and Firewalls, i.e. the ACL(s) can be migrated from another PE and applied to the local PE. When the troubleshooting is finished, the local PE's network policy can be restored from the backup saved copies.

PE Network QoS—PE's debugging system should allow temporarily increasing and decreasing of various Traffic Engineering parameters, such as, Single Rate Three Color Marker (IETF standard RFC2697 based srTCM), Two Rate Three Color Marker (IETF standard RFC2698 based trTCM), IEEE-802.1P Packet Priority Mapping, Differentiated Services Code Point (DSCP) Packet Marking Policies, Packet Queuing Policies, Packet Buffer Memory Sharing Policies, Congestion Control and Congestion Drop Policies, Congestion Avoidance Policies, e.g. RED, WRED, Packet Scheduling Policies, e.g. Strict Priority Queuing (SPQ), Weighted Round Robin (WRR), Deficit Round Robin (DRR), Weighted Elastic Round Robin (WERR), to observe overall operational and performance behavior changes in the PE and also in the network domain surrounding the PE device.

PE Network Isolation—To debug and troubleshot a complex issue involving network control or traffic forwarding loop or CB-To-PE discovery issue or Traffic Load balancing issue, it should be possible to isolate a part of PE network domain from the rest of the extended virtual bridging topology. Such PE network domain isolation is temporary and achieved by Access Control List (ACL) on network interfaces at the boundaries of the PE network domain, so that traffic flowing through this network domain does not enter into other parts of the network outside the domain of observation for debugging and troubleshooting purposes. When the troubleshooting is over, the PE network can be restored to its previous status by removing the ACL(s) that were temporarily applied on interfaces.

Stack-To-IEEE-802.1BR Virtual Networking—The extended virtual bridging network topology corresponds to a Multi-Rooted Forest of Tree Topologies with each root node representing an IEEE-802.1BR Controller Bridge device. For network resiliency and high availability reasons, a PE device may be multihomed with multiple CB devices. In normal IEEE-802.1BR network operational scenarios, either all of the redundant links of multi-homing scenarios can be used simultaneously for CB-To-PE Traffic Load balancing purposes or only one Link can be used as Primary/Active Link and the remaining can stay as standby Links. When the Primary/Active link goes down, one of the Standby Link takes over as the new Primary/Active Link for seamless failover. Thus in either policies of Multi-Homing scenarios, the debugging mechanism of CB and PE should allow, dynamic re-assignment of Primary/Active Link or dynamic changes of Policy from single Active Link usage to simultaneous usage of all redundant Link(s) for traffic Load balancing purposes, and vice versa to observe the behavioral and performance changes of customer Traffic flow through the extended virtual bridging network topology.

PE Load Balancing—To observe the changes in PE's overall operational behavior and performances due to changes in Load Balancing, PE devices should allow programming/re-programming of Load Balancing of Traffic across member ports of a Physical or Virtual Ethernet Aggregate Link, or Multi-Chassis Trunk interfaces, or across multiple PE Uplink Ports when Edge-PE(s) are multi-homed with multiple Member CB(s) or multi-homed with multiple Transit-PE(s).

PE SLA Performance—PE's debugging facility should allow increasing and decreasing the SLA performance monitoring parameters, in order to troubleshoot PE's Traffic Engineering SLA performance non-compliance or under-compliance issues.

4.2.10.4 Distributed Debug Command Processing

The PEs and member CBs in an extended bridge can be configured to generate events based on certain network entity's monitored status changes, monitored traffic counter threshold crossings, monitored traffic queue occupancy threshold hit conditions, or lookup failure rates, etc. Such event trigger threshold parameters can be provisioned on the PE devices or member CBs from the master CB.

4.2.10.5 Debug Command Distribution Scope

In various embodiments, any distributed debug CLI command or distributed CLI show command can be executed at the following set of destination devices:
All PE device destinations
All Edge PE device destinations
All Transit PE device destinations
All CB device destinations
All CB and PE device destinations of the extended bridge fabric
All PE devices of a Tree rooted under a CB device
User specified list of CB devices
User specified list of PE devices
User specified list or CB and PE devices 4.2.10.6 Debug Command Execution Frequency In various embodiments, any distributed debug CLI command or distributed CLI show command can be executed at the specified set of destination devices either as a one shot command or on periodic basis at user-specified time intervals or frequencies.

4.2.10.7 Distributed Debug Command Request Submission

Distributed debug CLI commands are optional extensions to existing CLI configuration or show commands that are executed from the master CB's CLI console. These optional extensions consist of specifying a set of destination member CB and/or PE units where the user specified CLI command should be executed.

If no optional destination unit ID(s) are specified, then the CLI command's behavior can default to a behavior in which the CLI command is executed only at the master CB's CLI console.

Since the DDM framework can be responsible for distributing any switch CLI command, including but not limited to CLI protocol objects show commands, statistics show commands, various DM commands and any protocol or infrastructure configuration commands, a generic TLV structured information modeling framework can be used so that CLI command parameters can be encoded in the ITC API data.

The CLI commands entered by the console user can undergo syntax and semantics parsing as usual, but the action for a parsed and accepted command can be to submit the command via an ITC API, to a newly added command distribution framework.

Figure 15:
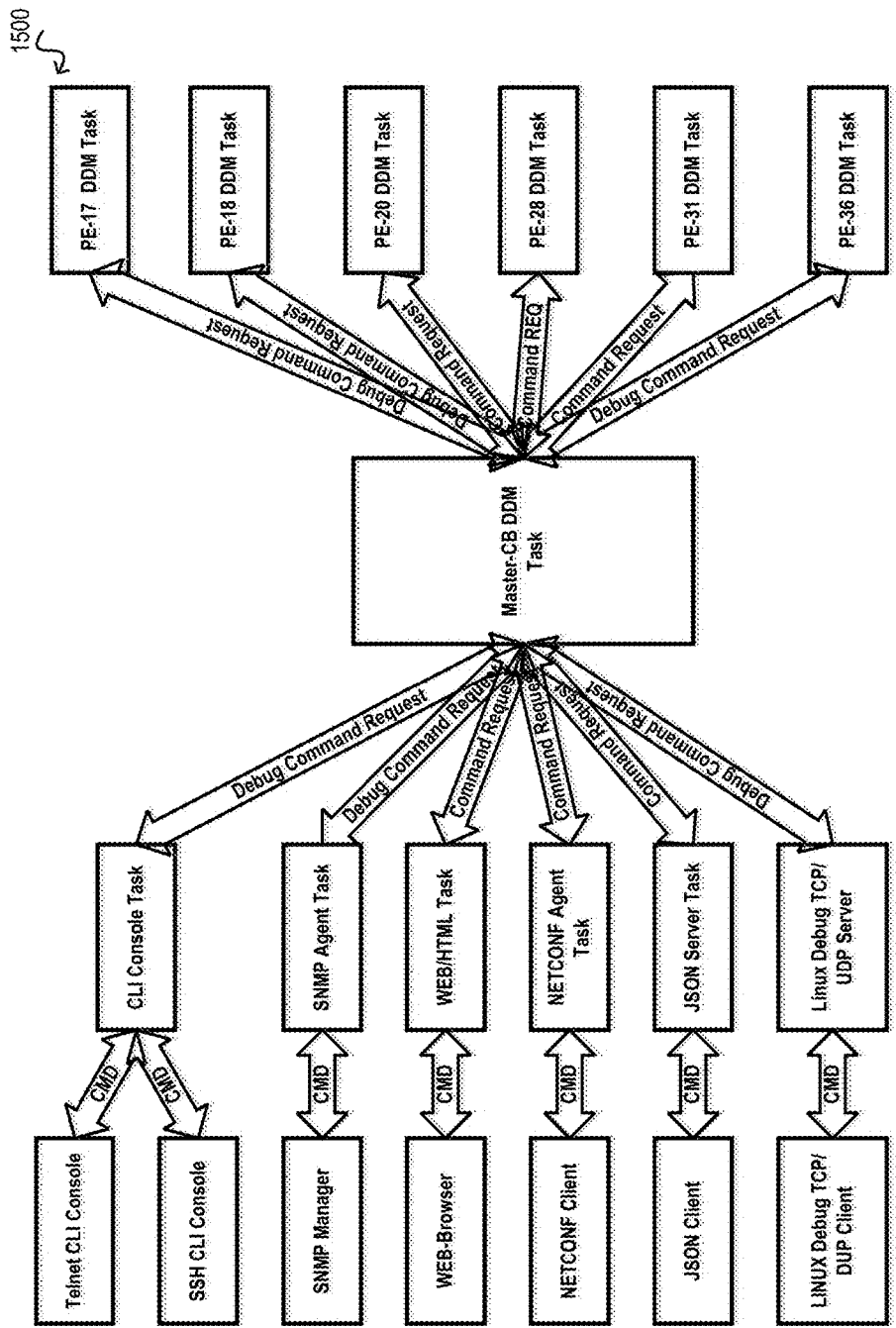
FIG. 15 depicts a diagram illustrating example senders that may submit distributed debugging commands to a distributed debug manager (DDM) service running on a master CB according to an embodiment.

A debug user can submit the distributed debug command request at the master CB via any of the following input devices.
Remotely via Telnet or SSH session to CLI console and executing the debug CLI commands
As a batch job by copying the debug CLI commands over FTP or TFTP
Remotely via SNMP Manager's MIB set operations
Remotely via Web-Management GUI Interface
Remotely via NETCONF Client's XML set operations
Remotely via Linux Distributed-Debug Client Program 4.2.10.8 Distributed Debugging Command Senders FIG. 15 depicts a diagram 1500 illustrating example senders that may submit distributed debugging commands to the DDM service running on the master CB.

4.2.10.9 Distributed Debug Master CB Command Information Model

Figure 16:
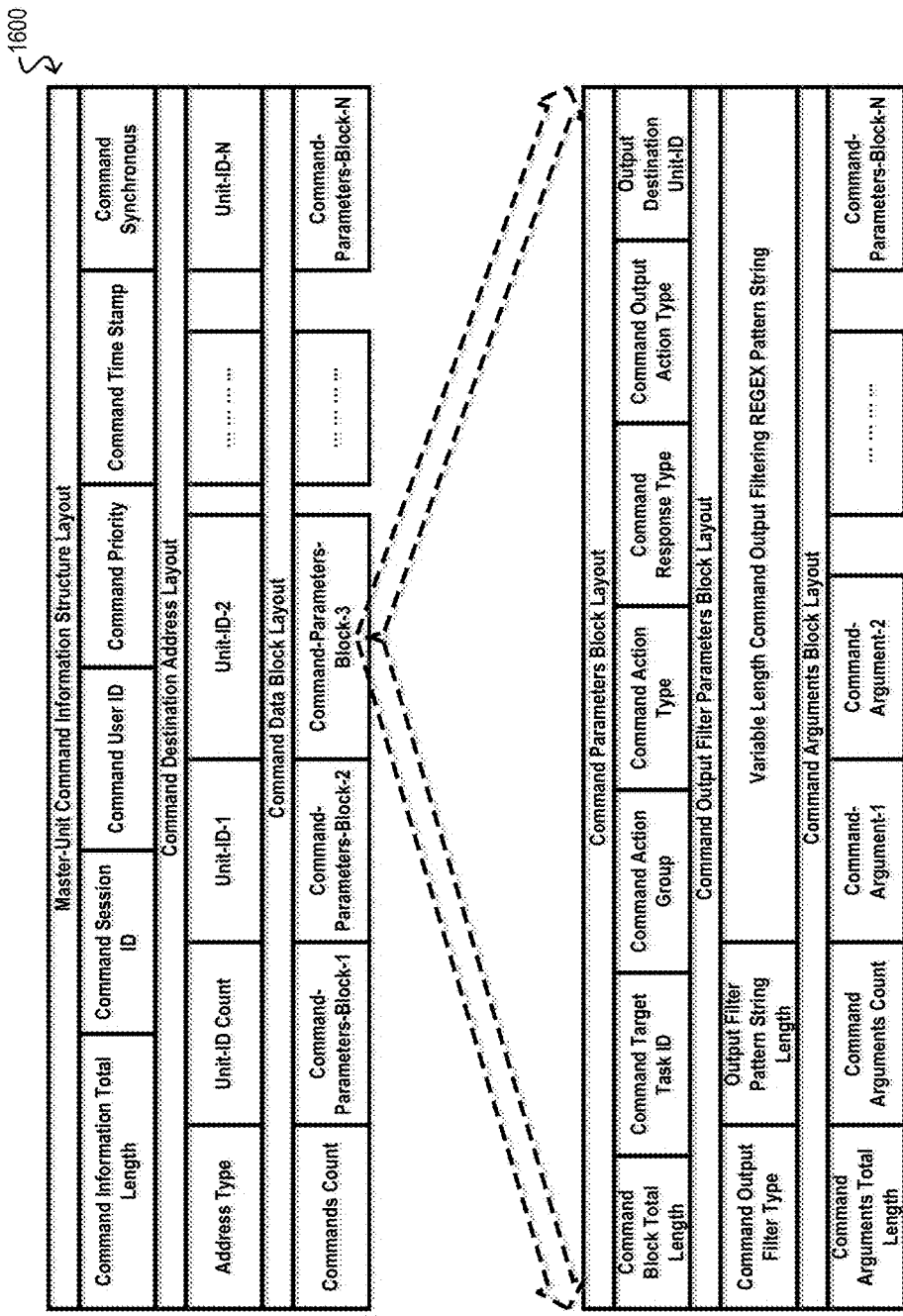
FIG. 16 depicts a layout for a master CB distributed debug command according to an embodiment.

FIG. 16 depicts a diagram 1600 illustrating the layout for a Master CB distributed debug command according to an embodiment.

4.2.10.10 Distributed Debugging Destination Unit Command Information Model

Figure 17:
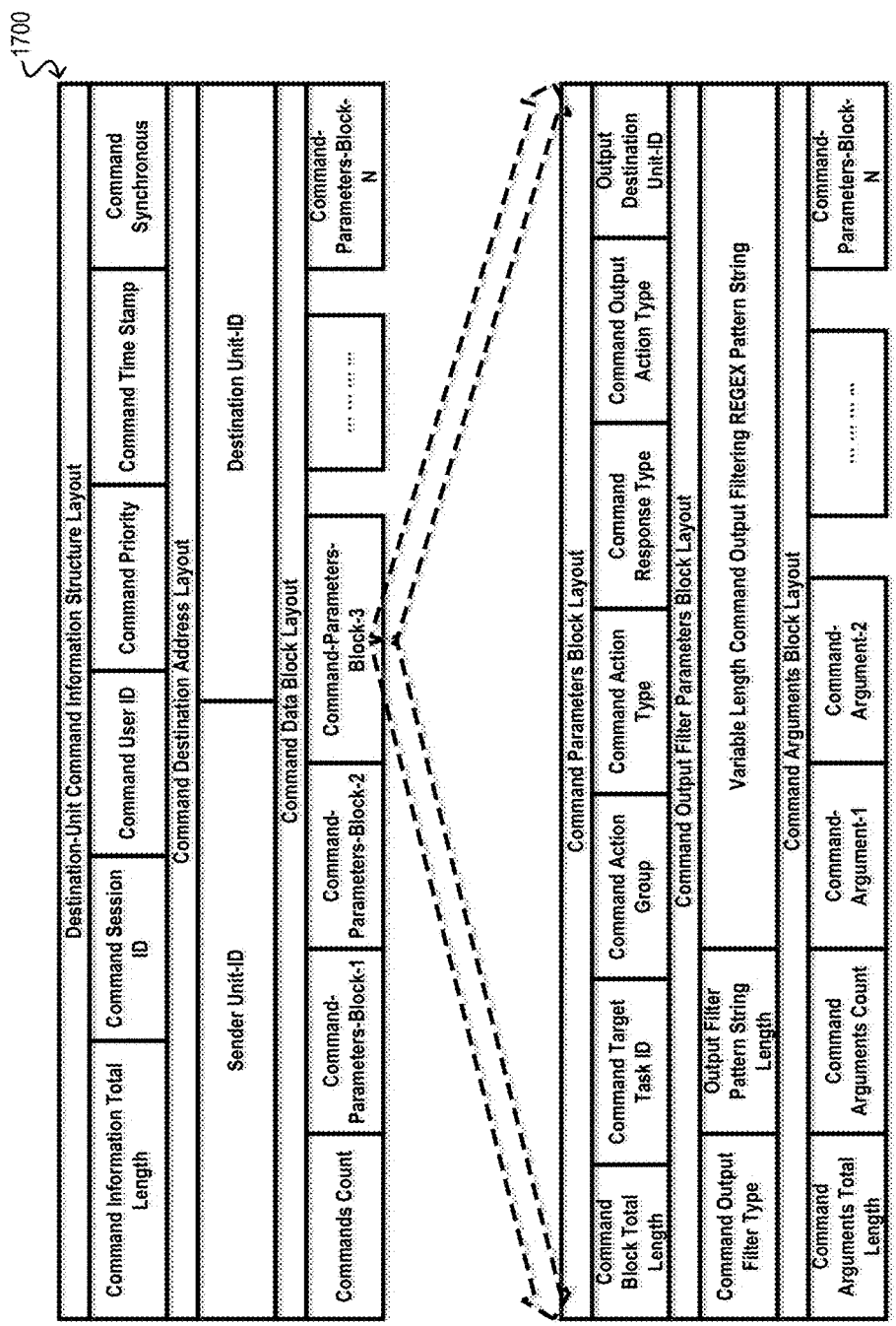
FIG. 17 depicts a layout for a destination unit distributed debug command according to an embodiment.

FIG. 17 depicts a diagram 1700 illustrating the layout for a destination unit distributed debug command according to an embodiment.

4.2.10.11 Distributed Debug Command Action at Destination

The distributed debugging CLI commands can be distributed by the DDM framework to the destination member CB and/or PE devices as transactions via the distributed transaction manager described previously in the present disclosure.

The DDM, which runs in a distributed master/slave architecture, is responsible for de-multiplexing the received CLI Commands to the appropriate protocol or infrastructure sub-system(s) via ITC-API. For example, a single CLI command which is of composite type (e.g., "show tech-support all") can intrinsically translate into multiple atomic "show tech-support <object>" commands. This is correctly handled at the destination by de-multiplexing and handing over the individual "show tech-support <Object>" commands to the responsible protocol sub-system(s).

The DDM sub-system can perform this de-multiplexing in an opaque manner, i.e. by using the TLV structured encoded information received from the master CB's command request.

The protocol sub-systems at the destination devices can handle the received commands by running a database table walk/traversal or multi-dimensional query based on the received pattern-matching key combinations. Matched table rows should be encoded into command response TLV structures and sent by the response submission ITC-API of the DDM sub-system, if the CLI user has so requested.

4.2.10.12 Distributed Debug Command Response Data Reporting

There is an increasing demand for distributing security, firewall, and traffic engineering services on the PE devices closest to the network edge, so that such services can be provisioned and monitored closest to the end-user devices in a more efficient and cost effective manner. However, the debugging and troubleshooting of such distributed services on IEEE 802.1BR PE devices becomes increasingly complex in nature.

Also to verify/troubleshoot the performance capabilities of an extended bridge at a multi-dimensional scale, a huge amount of data would be generated by each bridge unit, and would need to be transmitted to, and analyzed by, the master CB.

To address these issues, the following sub-sections describe techniques that can allow the master CB to handle debug-originated "big data" within the master CB in an intelligent and scalable manner.

It should be noted that the DDM framework can also utilize the services of external SYLOG or Debug-Log Servers to transmit the debug data out so that offline debug log analysis can be performed algorithmically on external servers for, e.g., root-cause analysis of extended bridge operational issues (e.g. Virtual bridging/traffic forwarding failures, security/firewall failures, multicast traffic forwarding failures, QoS in-efficiencies, PE system performance issues or service scalability, availability/resiliency issues, etc.).

4.2.10.12.1 Debug Data Collection Capabilities

The output of a debug command execution at PE devices should be segmented and dispatched in an incremental fashion to the Master CB node. The internal control messages that are carrying debug output should be assigned lower CoS priorities so that those do not compete for bandwidth against the SLA bound customer's service traffic that might be passing through the extended bridge topology. The debug output segment size and the frequency of transmission may be configurable parameters and controlled by a network policy. Also the volume of debug output data should be sent in a controlled fashion so that transmission of such data from PE devices to the master CB do not result in congestion inside the extended bridge topology.

4.2.10.12.2 Debug Data Pre-Processing Capabilities

Certain debug output data may contain textual strings indicating some protocol or network interface status or system behavior, which can be more economically sent as fewer integer encodings and decoded, interpreted as the original textual information data at the destination, i.e. on master CB during formatted output display. The protocol applications or system infrastructure applications that support specific distributed debug commands may define compact response message payload structures to transport their debug command outputs in optimal manner without consuming much of bandwidth resources of the interior links of the Virtual Chassis network topology.

4.2.10.12.3 Debug Data Storage Capabilities

The distributed debug mechanism would allow a network administrator to configure IP addresses of external debug servers which can store large volume of debug output data into database systems. Thus network administrators can query such external database to search for specific event reports or fault reports or traffic counters for debugging or troubleshooting a complex network fault or a traffic management compliance issue. These external database server stored debug output data can also be used by cloud based network management services.

4.2.10.12.4 Debug Data Analytics Capabilities

In order to facilitate data analytics of the customer services transported through the extended bridge topology or analytics of extended virtual bridging network performance or traffic characterizations, the distributed debugging mechanism supports a distributed monitoring capability.

A Network administrator can configure and enable or disable distributed monitoring of customer services, e.g. E-tagged customer traffic flow through the extended virtual bridging topology or configure monitoring of traffic through the VXLAN or NVGRE tunnels that transit from one extended bridge to another through a VDC.

The distributed analytics engine in extended bridge consists of data monitoring tasks that run in a distributed manner on every CB and PE device. The monitoring feature, when enabled via CLI or SNMP at the master CB, would periodically monitor objects e.g. Point-To-Point or Point-To-MultiPoint E-tagged traffic flow between ingress and egress PE devices, or VXLAN or NVGRE tunnels between a local and remote extended bridge across a VDC.

The monitored statistics data can be sent from PE and member CB devices to the master CB where they are aggregated before sending out to an external data analytics engine, which may be part of an external NMS station or cloud based NMS.

4.2.10.12.5 Debug Data Visualization Capabilities

The external NMS system or the Cloud based network management system may have data visualization capabilities which would allow visualization and analysis of the monitored data sent from the internal embedded distributed data analytics engine of the extended virtual bridging system.

4.2.10.12.6 Debug Data Security and Protection Capabilities

When the debug output data is sent to external debug server for database storage and offline analysis, the debug server may be located multiple hops away and thus the data may be vulnerable to security risks or denial of service attack. To facilitate a secure and protected transmission of debug output data, the industry standard SSL based transport mechanism can be used between the master CB and the external debug server.

4.2.10.12.7 Distributed Debug Command Response Processing

A CLI user at the master CB can request debug command responses to be output onto one or more of the following output devices.

Display on master CB's console output device

Save on master CB's flash disk

Send debug output log to an external SYSLOG server

Send debug output log to an external debug logging server for database storage and analytics processing Send debug output log via FTP/TFTP to an external server for offline data analysis or troubleshooting Display on destination device's (e.g., PE or member CB) console output device Save on destination device's flash disk Send debug output log to Cloud Big-Data Service provider for storage, post-processing, algorithmic-transformation, analytics, machine learning and expert root cause analysis, capacity planning, forecasting, etc.

4.2.10.12.8 Distributed Debug Command Response Data Model

Figure 18:
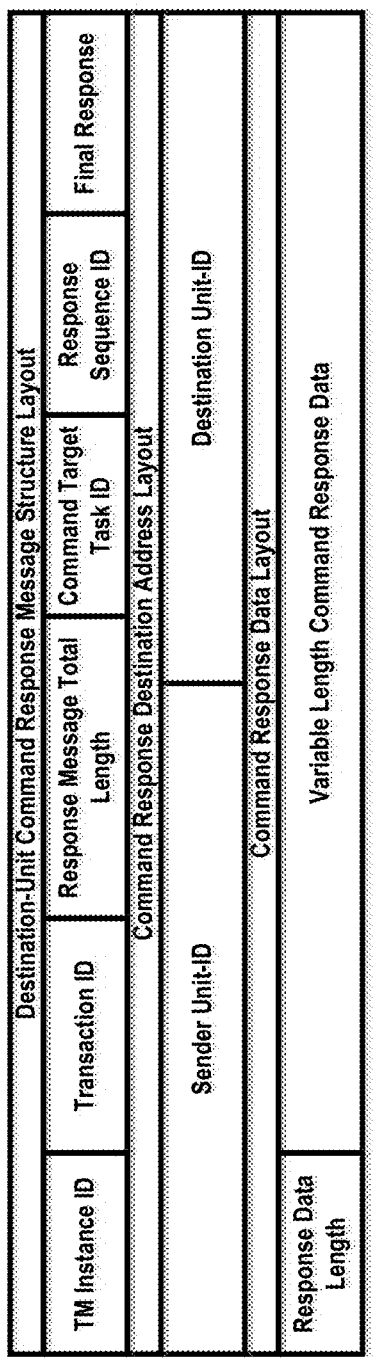
FIG. 18 depicts a debug response data object according to an embodiment.

The debug response data at the destination device can be encoded into variable length TLV structured objects by the protocol applications based on database table traversal or database query matches. An example of such an object is shown in FIG. 18 as diagram 1800.

There may be several matches of the query executions, and hence response data should be segmented and submitted to the DDM slave in a burst mode and time sliced manner to avoid congestion losses.

4.2.10.13 Event Driven Debugging/Provisioning Theory

The PE devices and member CB devices can be configured to generate events based on various conditions detected at the unit (e.g., status changes, traffic counter threshold crossing, traffic queue occupancy threshold hit, lookup failure rate, etc.). Such event trigger threshold parameters can be provisioned on the PE devices or member CB devices from the master CB.

The following list shows a sub-set of monitored events that may be supported according to an embodiment.

SCP-Events, Port-Up, Port-Down, PE-Up, PE-Restart.

Forwarding-Engine Monitored Events Packet TX/RX Drop-Threshold Hit.

Egress H/W Queue Occupancy Threshold Hit

Egress UC/MC Queue Congestion-Drop (PFC, WRED] High-Water-Mark Hit

Network Processor's Hardwire Registers/Memory Table Programming Failures

Network Processor's Hardwire Events, Hardwire MAC Aging, Hardwire Data Path based MAC Learning.

TCAM Blocks Free Space Exhaustion of specified Categories, Single-Width, Double-Width, Quadruple-Width BUM Traffic Metering Drop Counters Monitor Threshold Hit.

DOS-Attack Metering Threshold Hits

MAC Layer Authentication, on Dynamic MAC-Sessions Learning, Age-Expiry, Purging.

On ACL Rules Permit/Deny Category Hit

On Control-Protocol Snooping Hit [IGMPv3, MLDv2, DHCP]

LLDP Neighbor Discovery/Losses

IEEE-802.1BR Standard CSP Neighbor Discovery/Losses.

Virtual-Ethernet LAG Failover, IEEE-802.1BR Port-Extension Capable Ethernet LAG Failover.

Dynamic LAG Member Addition/Removals.

4.2.10.13.1 Event Driven Distributed Debug Command Execution

Users can configure existing or new CLI debug/show commands or CLI tech-support commands to be executed on a specified list of PE devices or member CB devices automatically based on certain event triggers. The event triggered distributed debugging and distributed provisioning feature would require:

Periodic monitoring of several H/W Tables used by the Packet-Forwarding Engine (PFE).

Monitoring of peripheral Sensors, e.g. Temperature sensors LM75, Voltage sensors, UPS redundancies, Optics Faults at SFP, SFP+, QSFP etc.

The DDM infrastructure would implement a distributed Event Management Task based framework.

However several implementations would be needed for PFE tables monitoring and S/W or H/W peripheral interrupts or status polling by those component owners.

The debugging/troubleshooting CLI commands or event driven provisioning commands are supported by the individual protocol features in the extended bridge. Thus when new protocol features are added, additional debugging CLI commands might be needed to ensure that the bridge remains fully debug-able.

4.2.10.14 Distributed Debugging System Architecture

Figure 19:
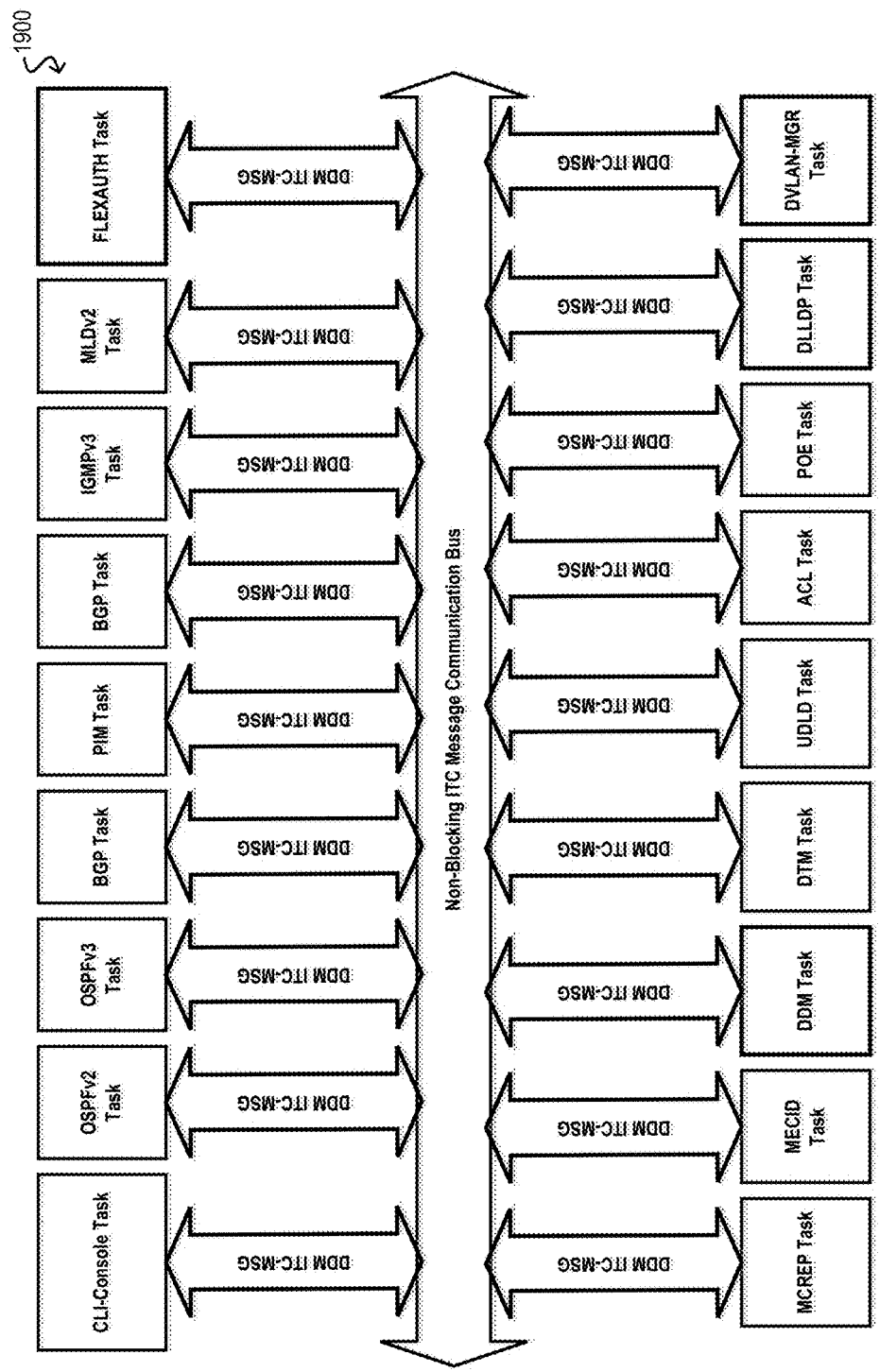
FIG. 19 depicts a diagram of a DDM task architecture according to an embodiment.

FIG. 19 depicts a diagram 1900 of the 'Distributed Debug Manager (DDM)' Task architecture according to an embodiment. As shown, the architecture includes a number of protocol/application tasks that communicate with a DDM task (shown in green) via a non-blocking Inter-Task-Communication (ITC) mechanism as the message communication bus.

4.2.10.14.1 DDM System Interaction Architecture

Figure 20:
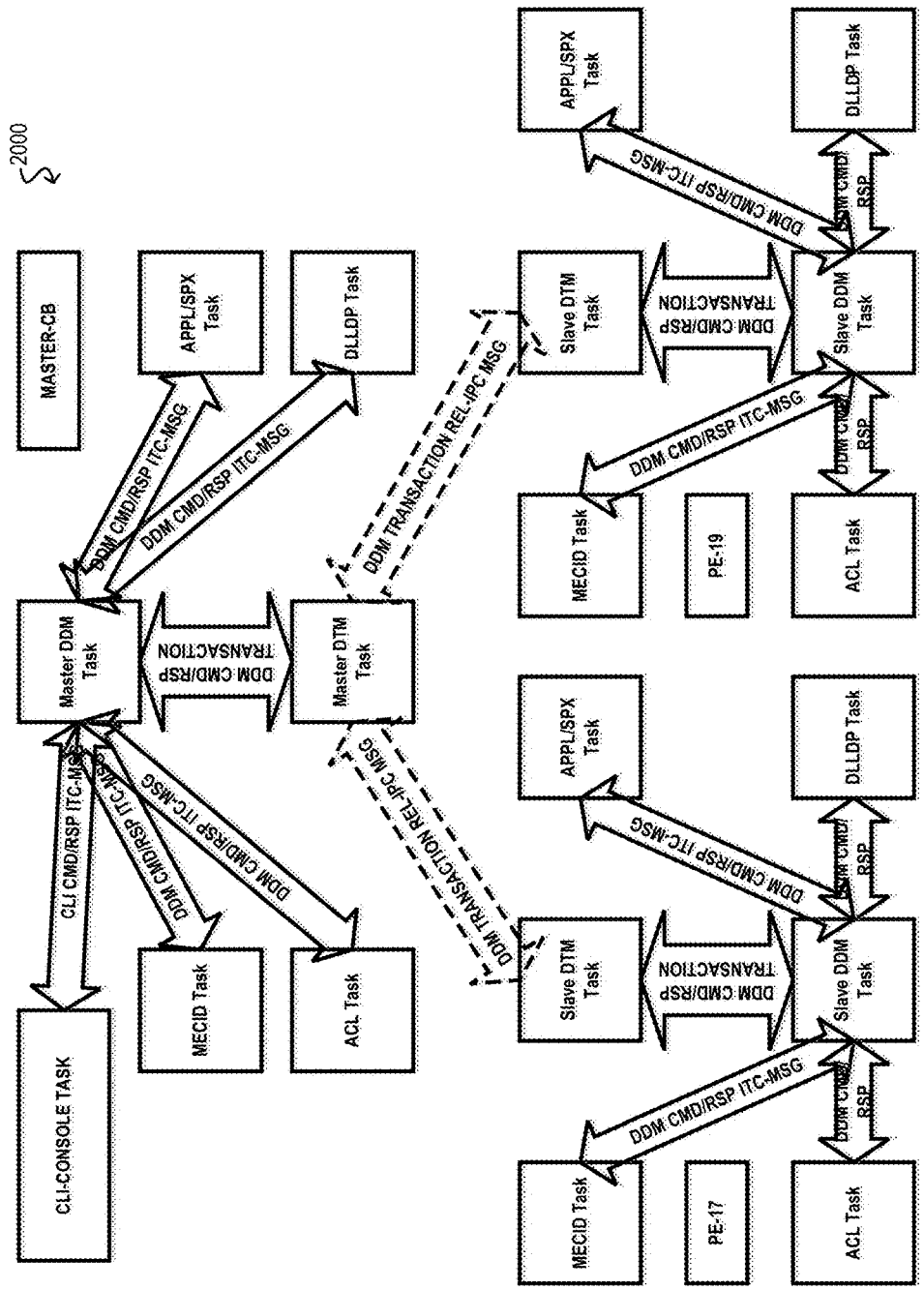
FIG. 20 depicts a diagram of the interaction between components in the DDM architecture according to an embodiment.

FIG. 20 depicts a diagram 2000 of the interaction between components in the DDM architecture. As shown, a master DDM task running on the master CB interacts with various protocol/application tasks on the master CB, as well as a master distributed transaction manager task (DTM) for communicating with other units in the extended bridge. Further, slave DDM task running on PE-17 and PE-18 interacts with various protocol/application tasks running on the PEs, as well as a slave DTM task for communicating with the master DTM task running on the master CB. These interactions are described in further detail in the section below.

4.2.10.14.2 Distributed Debugging Theory of Operation

The master DDM task component running on the master CB can accept CLI Debug/Show/Tech-Support command requests with a specified list of targeted destination unit IDs from the CLI-Console Task. The master DDM task can then distribute the requested command towards the destinations as a transaction with the help of the master DTM task.

The slave DTM tasks on the destination (i.e., PE or member CB) devices can hand over the transaction to the local slave DDM tasks. The slave DDM tasks can decode the received CLI command and can de-multiplex it by sending ITC messages to the appropriate targeted protocol tasks, e.g. ACL, FLEX-AUTH, LLDP, MCREP, MECID etc.

Certain CLI Show-Tech commands are composite in nature and can translate into multiple sub-commands which need to be executed by multiple protocol tasks at the destinations. In these cases, the slave DDM tasks at the destination devices can de-multiplex a composite Show-Tech command into multiple Atomic Show-Tech sub-commands and can forward the individual sub-commands to the appropriate protocol tasks.

The protocol tasks can execute the received CLI command request and can respond back to the slave DDM task via a DDM provided response-ITC API. In the case of a composite Show-Tech command, multiple protocol tasks will send responses back to the slave DDM task at a destination device. In this scenario, the slave DDM task can appropriately sequence and label the received responses, so that the CLI user at the master CB will be able to identify and locate a response output from a specific destination unit and specific protocol component.

The slave DDM task can forward all of the responses received from various protocol tasks as transaction-responses to the slave DTM task. The slave DTM task on each destination device can then send a response back to the master DTM task at the master CB.

Upon receiving the response, the master DTM task at the master CB can sequence and consolidate the received responses for a pending distributed Show/Debug command request. The master DTM task can then invoke a registered Command-Response-Display-Formatter call-back API in order to display the received Show/Debug command response outputs. Finally, the master DTM task can send a deferred-ITC response to the CLI-Console task after the last received response has been displayed or redirected to the user specified output device, and the CLI Console Task can be free to accept another CLI command from Telnet/SSH or the console user.

4.2.10.14.3 Distributed Debugging Command Output Display Scheduling

Figure 21:
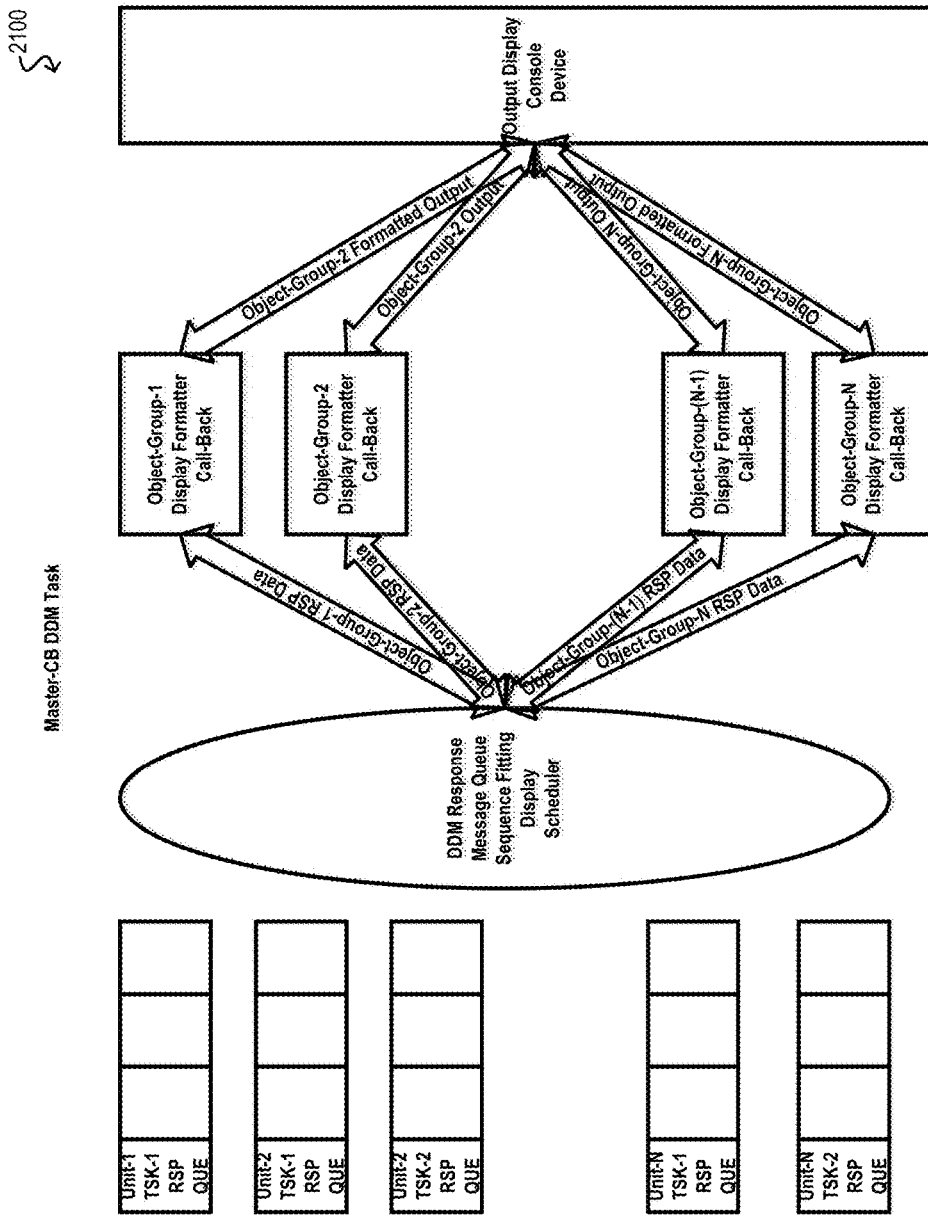
FIG. 21 depicts a diagram illustrating how distributed debug command output may be scheduled for display on a master CB according to an embodiment.

FIG. 21 depicts a diagram 2100 illustrating how distributed debug command output is scheduled for display on the master CB according to an embodiment. As shown, the master DDM task maintains a response queue for each destination device and each protocol task running on that device that is subject to debugging. Response messages are received and placed in the appropriate queue. A display scheduler then sequences the display of the response messages and calls an appropriate callback API to display formatted results for the sequenced messages on an output display device of the master CB.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
 receiving, by a controlling bridge (CB) in an extended bridge, a command to create or delete a packet classification rule for one or more virtual ports of the extended bridge;
 determining, by the CB, a port extender (PE) of the extended bridge that hosts one or more physical ports corresponding to the one or more virtual ports; and
 transmitting, by the CB, a message to the PE with instructions for creating or deleting the packet classification rule in a ternary content addressable memory (TCAM) of the PE,
 wherein the CB manages a virtualized representation of the TCAM of the PE, and
 wherein the virtualized representation includes an indication of a total capacity of the TCAM of the PE.

2. The method of claim 1 wherein the packet classification rule is not created or deleted in a TCAM of the CB.

3. The method of claim 1 wherein the packet classification rule is a security access control list (ACL) rule.

4. The method of claim 1 wherein the message is transmitted to the PE via a transaction manager configured to ensure reliable communication of the message.

5. The method of claim 1 wherein the receiving, determining, and transmitting are performed using an instance of a rule provisioning task agent running on the CB.

6. A non-transitory computer readable storage medium having stored thereon program code executable by a controlling bridge (CB) in an extended bridge, the program code causing the CB to:
 receive a command to create or delete a packet classification rule for one or more virtual ports of the extended bridge;
 determine a port extender (PE) of the extended bridge that hosts one or more physical ports corresponding to the one or more virtual ports; and
 transmit a message to the PE with instructions for creating or deleting the packet classification rule in a ternary content addressable memory (TCAM) of the PE,
 wherein the CB manages a virtualized representation of the TCAM of the PE, and
 wherein the virtualized representation includes an indication of a total capacity of the TCAM of the PE.

7. A controlling bridge (CB) in an extended bridge, the CB comprising:
 a processor; and
 a non-transitory computer readable medium having stored thereon program code that, when executed by the processor, causes the processor to:
 receive a command to create or delete a packet classification rule for one or more virtual ports of the extended bridge;
 determine a port extender (PE) of the extended bridge that hosts one or more physical ports corresponding to the one or more virtual ports; and
 transmit a message to the PE with instructions for creating or deleting the packet classification rule in a ternary content addressable memory (TCAM) of the PE,
 wherein the CB manages a virtualized representation of the TCAM of the PE, and
 wherein the virtualized representation includes an indication of a total capacity of the TCAM of the PE.

8. A method comprising:
 receiving, by a controlling bridge (CB) in an extended bridge, a command to create or delete a packet classification rule for one or more virtual ports of the extended bridge;
 determining, by the CB, a port extender (PE) of the extended bridge that hosts one or more physical ports corresponding to the one or more virtual ports; and
 transmitting, by the CB, a message to the PE with instructions for creating or deleting the packet classification rule in a ternary content addressable memory (TCAM) of the PE,
 wherein the CB manages a virtualized representation of the TCAM of the PE, and
 wherein the virtualized representation includes an indication of which entries in the TCAM of the PE are currently populated with rules.

9. A method comprising:
 receiving, by a controlling bridge (CB) in an extended bridge, a command to create or delete a packet classification rule for one or more virtual ports of the extended bridge;
 determining, by the CB, a port extender (PE) of the extended bridge that hosts one or more physical ports corresponding to the one or more virtual ports; and
 transmitting, by the CB, a message to the PE with instructions for creating or deleting the packet classification rule in a ternary content addressable memory (TCAM) of the PE,
 wherein the CB manages a virtualized representation of the TCAM of the PE, and
 wherein managing the virtualized representation comprises determining, via the virtualized representation, whether the TCAM of the PE has sufficient free space for programming the packet classification rule into the TCAM.

10. The method of claim 9 wherein, if the TCAM of the PE does not have sufficient free space, programming the packet classification rule into a TCAM of the CB.

11. A method comprising:
receiving, by a controlling bridge (CB) in an extended bridge, a command to create or delete a packet classification rule for one or more virtual ports of the extended bridge;
determining, by the CB, a port extender (PE) of the extended bridge that hosts one or more physical ports corresponding to the one or more virtual ports; and
transmitting, by the CB, a message to the PE with instructions for creating or deleting the packet classification rule in a ternary content addressable memory (TCAM) of the PE,
wherein the CB manages a virtualized representation of the TCAM of the PE, and
wherein managing the virtualized representation comprises creating or deleting the packet classification rule in the virtualized representation upon determining the TCAM of PE has been updated.

12. A method comprising:
receiving, by a controlling bridge (CB) in an extended bridge, a command to create or delete a packet classification rule for one or more virtual ports of the extended bridge;
determining, by the CB, a port extender (PE) of the extended bridge that hosts one or more physical ports corresponding to the one or more virtual ports;
transmitting, by the CB, a message to the PE with instructions for creating or deleting the packet classification rule in a ternary content addressable memory (TCAM) of the PE;
monitoring, by the PE, for a match of the packet classification rule against ingress or egress data traffic at the PE;
upon detecting a match of the packet classification rule, creating or updating, by the PE, an event information entry in a local event database of the PE; and
upon passage of a predefined reporting time interval:
batching, by the PE, all unreported event information entries in the local event database into a single reporting message; and
transmitting, by the PE, the reporting message to the CB.

13. The method of claim 12 further comprising, in response to receiving the reporting message:
informing, by the CB, a user of one or more of the events included in the reporting message.

14. The method of claim 12 further comprising, in response to receiving the reporting message:
autonomously performing, by the CB, a corrective action within respect to one or more PEs in the extended bridge.

15. The method of claim 12 further comprising, in response to receiving the reporting message:
sending, by the CB, information derived from the reporting message to an external network management system or system log server.

* * * * *